United States Patent
Ording

(10) Patent No.: US 7,614,008 B2
(45) Date of Patent: Nov. 3, 2009

(54) OPERATION OF A COMPUTER WITH TOUCH SCREEN INTERFACE

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 614 days.

(21) Appl. No.: 11/228,700

(22) Filed: Sep. 16, 2005

(65) Prior Publication Data

US 2006/0053387 A1    Mar. 9, 2006

Related U.S. Application Data

(63) Continuation-in-part of application No. 10/903,964, filed on Jul. 30, 2004.

(51) Int. Cl.
*G06F 3/048* (2006.01)
*G06F 3/041* (2006.01)

(52) U.S. Cl. ........................ 715/773; 345/173
(58) Field of Classification Search ........... 345/173; 715/773
See application file for complete search history.

(56) References Cited

U.S. PATENT DOCUMENTS

| | | |
|---|---|---|
| 3,333,160 A | 7/1967 | Gorski |
| 3,541,541 A | 11/1970 | Englebart |
| 3,662,105 A | 5/1972 | Hurst et al. ............... 178/18 |
| 3,798,370 A | 3/1974 | Hurst ......................... 178/18 |
| 4,246,452 A | 1/1981 | Chandler ..................... 200/5 |
| 4,550,221 A | 10/1985 | Mabusth ..................... 178/18 |
| 4,672,364 A | 6/1987 | Lucas .................... 340/365 P |
| 4,672,558 A | 6/1987 | Beckes et al. ............... 364/518 |
| 4,692,809 A | 9/1987 | Beining et al. .............. 358/247 |
| 4,695,827 A | 9/1987 | Beining et al. ........... 340/365 P |
| 4,733,222 A | 3/1988 | Evans .................... 340/365 C |
| 4,734,685 A | 3/1988 | Watanabe .................... 340/710 |
| 4,746,770 A | 5/1988 | McAvinney .................. 178/18 |
| 4,771,276 A | 9/1988 | Parks ......................... 340/712 |
| 4,788,384 A | 11/1988 | Bruere-Dawson et al. ..... 178/18 |

(Continued)

FOREIGN PATENT DOCUMENTS

CA           1243096       10/1988       ................ 340/180

(Continued)

OTHER PUBLICATIONS

U.S. Appl. No. 10/840,862, filed May 6, 2004.

(Continued)

*Primary Examiner*—Joshua D Campbell
*Assistant Examiner*—Stephen Alvesteffer
(74) *Attorney, Agent, or Firm*—Morgan, Lewis & Bockius LLP

(57) ABSTRACT

A touch screen computer executes an application. A method of operating the touch screen computer in response to a user is provided. A virtual input device is provided on the touch screen. The virtual input device comprises a plurality of virtual keys. It is detected that a user has touched the touch screen to nominally activate at least one virtual key, and a behavior of the user with respect to touch is determined. The determined behavior is processed and a predetermined characteristic is associated with the nominally-activated at least one virtual key. A reaction to the nominal activation is determined based at least in part on a result of processing the determined behavior.

24 Claims, 8 Drawing Sheets

U.S. PATENT DOCUMENTS

| | | | |
|---|---|---|---|
| 4,806,846 A | 2/1989 | Kerber | 324/60 CD |
| 4,898,555 A | 2/1990 | Sampson | 445/22 |
| 4,968,877 A | 11/1990 | McAvinney et al. | 250/221 |
| 5,003,519 A | 3/1991 | Noirjean | 368/73 |
| 5,017,030 A | 5/1991 | Crews | 400/485 |
| 5,053,758 A | 10/1991 | Cornett et al. | 340/712 |
| 5,178,477 A | 1/1993 | Gambaro | 400/489 |
| 5,189,403 A | 2/1993 | Franz et al. | 340/711 |
| 5,194,862 A | 3/1993 | Edwards | 341/20 |
| 5,224,861 A | 7/1993 | Glass et al. | 434/35 |
| 5,241,308 A | 8/1993 | Young | 341/34 |
| 5,252,951 A | 10/1993 | Tannenbaum | |
| 5,281,966 A | 1/1994 | Walsh | 341/22 |
| 5,297,041 A * | 3/1994 | Kushler et al. | 715/202 |
| 5,305,017 A | 4/1994 | Gerpheide | 345/174 |
| 5,345,543 A | 9/1994 | Capps et al. | |
| 5,376,948 A | 12/1994 | Roberts | 345/173 |
| 5,398,310 A | 3/1995 | Tchao et al. | |
| 5,442,742 A | 8/1995 | Greyson et al. | |
| 5,463,388 A | 10/1995 | Boie et al. | 341/33 |
| 5,463,696 A | 10/1995 | Beernink et al. | |
| 5,483,261 A | 1/1996 | Yasutake | 345/173 |
| 5,488,204 A | 1/1996 | Mead et al. | 178/18 |
| 5,495,077 A | 2/1996 | Miller et al. | 178/18 |
| 5,513,309 A | 4/1996 | Meier et al. | |
| 5,523,775 A | 6/1996 | Capps | |
| 5,530,455 A | 6/1996 | Gillick et al. | 345/163 |
| 5,543,590 A | 8/1996 | Gillespie et al. | 178/18 |
| 5,543,591 A | 8/1996 | Gillespie et al. | |
| 5,563,632 A | 10/1996 | Roberts | 345/173 |
| 5,563,996 A | 10/1996 | Tchao | |
| 5,565,658 A | 10/1996 | Gerpheide et al. | 178/19 |
| 5,579,036 A | 11/1996 | Yates, IV | 345/173 |
| 5,581,681 A | 12/1996 | Tchao et al. | |
| 5,583,946 A | 12/1996 | Gourdol | |
| 5,590,219 A | 12/1996 | Gourdol | |
| 5,592,566 A | 1/1997 | Pagallo et al. | |
| 5,594,810 A | 1/1997 | Gourdol | |
| 5,596,694 A | 1/1997 | Capps | |
| 5,612,719 A | 3/1997 | Beernink et al. | |
| 5,631,805 A | 5/1997 | Bonsall | 361/681 |
| 5,633,955 A | 5/1997 | Bozinovic et al. | |
| 5,634,102 A | 5/1997 | Capps | |
| 5,636,101 A | 6/1997 | Bonsall et al. | 361/681 |
| 5,642,108 A | 6/1997 | Gopher et al. | 341/22 |
| 5,644,657 A | 7/1997 | Capps et al. | |
| 5,666,113 A | 9/1997 | Logan | 341/34 |
| 5,666,502 A | 9/1997 | Capps | |
| 5,666,552 A | 9/1997 | Greyson et al. | |
| 5,675,361 A | 10/1997 | Santilli | 345/168 |
| 5,677,710 A | 10/1997 | Thompson-Rohrlich | |
| 5,689,253 A | 11/1997 | Hargreaves et al. | 341/22 |
| 5,710,844 A | 1/1998 | Capps et al. | |
| 5,729,250 A | 3/1998 | Bishop et al. | 345/175 |
| 5,730,165 A | 3/1998 | Philipp | 137/1 |
| 5,736,976 A | 4/1998 | Cheung | 345/168 |
| 5,741,990 A | 4/1998 | Davies | 84/423 R |
| 5,745,116 A | 4/1998 | Pisutha-Arnond | |
| 5,745,716 A | 4/1998 | Tchao et al. | |
| 5,746,818 A | 5/1998 | Yatake | 106/31.86 |
| 5,748,269 A | 5/1998 | Harris et al. | 349/58 |
| 5,748,512 A | 5/1998 | Vargas | |
| 5,764,222 A | 6/1998 | Shieh | 345/173 |
| 5,764,818 A | 6/1998 | Capps et al. | |
| 5,767,457 A | 6/1998 | Gerpheide et al. | 178/18 |
| 5,767,842 A | 6/1998 | Korth | 345/168 |
| 5,790,104 A | 8/1998 | Shieh | 345/173 |
| 5,790,107 A | 8/1998 | Kasser et al. | 345/174 |
| 5,798,760 A | 8/1998 | Vayda et al. | |
| 5,802,516 A | 9/1998 | Shwarts et al. | |
| 5,808,567 A | 9/1998 | McCloud | 341/20 |
| 5,809,267 A | 9/1998 | Moran et al. | |
| 5,821,690 A | 10/1998 | Martens et al. | 313/506 |
| 5,821,930 A | 10/1998 | Hansen | 345/340 |
| 5,823,782 A | 10/1998 | Marcus et al. | 434/156 |
| 5,825,308 A | 10/1998 | Rosenberg | |
| 5,825,351 A | 10/1998 | Tam | 345/173 |
| 5,825,352 A | 10/1998 | Bisset et al. | 345/173 |
| 5,854,625 A | 12/1998 | Frisch et al. | 345/173 |
| 5,874,948 A | 2/1999 | Shieh | |
| 5,877,751 A | 3/1999 | Kanemitsu et al. | |
| 5,880,411 A | 3/1999 | Gillespie et al. | 178/18.01 |
| 5,898,434 A | 4/1999 | Small et al. | |
| 5,920,309 A | 7/1999 | Bisset et al. | 345/173 |
| 5,923,319 A | 7/1999 | Bishop et al. | 345/175 |
| 5,933,134 A | 8/1999 | Shieh | 345/173 |
| 5,943,044 A | 8/1999 | Martinelli et al. | 345/174 |
| 5,999,895 A * | 12/1999 | Forest | 704/1 |
| 6,002,389 A | 12/1999 | Kasser | 345/173 |
| 6,002,808 A | 12/1999 | Freeman | |
| 6,020,881 A | 2/2000 | Naughton et al. | 345/327 |
| 6,028,271 A | 2/2000 | Gillespie et al. | |
| 6,031,524 A | 2/2000 | Kunert | 345/173 |
| 6,037,882 A | 3/2000 | Levy | 341/20 |
| 6,050,825 A | 4/2000 | Nichol et al. | 434/227 |
| 6,052,339 A | 4/2000 | Frenkel et al. | 368/230 |
| 6,072,494 A | 6/2000 | Nguyen | |
| 6,073,036 A | 6/2000 | Heikkinen et al. | 455/575 |
| 6,084,576 A | 7/2000 | Leu et al. | 345/168 |
| 6,107,997 A | 8/2000 | Ure | 345/173 |
| 6,128,003 A | 10/2000 | Smith et al. | |
| 6,131,299 A | 10/2000 | Raab et al. | 33/503 |
| 6,135,958 A | 10/2000 | Mikula-Curtis et al. | 600/443 |
| 6,144,380 A | 11/2000 | Shwarts et al. | |
| 6,188,391 B1 | 2/2001 | Seely et al. | 345/173 |
| 6,198,515 B1 | 3/2001 | Cole | 348/836 |
| 6,208,329 B1 | 3/2001 | Ballare | 345/173 |
| 6,222,465 B1 | 4/2001 | Kumar et al. | |
| 6,239,790 B1 | 5/2001 | Martinelli et al. | 345/174 |
| 6,243,071 B1 | 6/2001 | Shwarts et al. | |
| 6,246,862 B1 | 6/2001 | Grivas et al. | 455/90 |
| 6,249,606 B1 | 6/2001 | Kiraly et al. | |
| 6,288,707 B1 | 9/2001 | Philipp | 345/168 |
| 6,289,326 B1 | 9/2001 | LaFleur | 705/702 |
| 6,292,178 B1 | 9/2001 | Bernstein et al. | 345/173 |
| 6,310,610 B1 * | 10/2001 | Beaton et al. | 345/173 |
| 6,323,846 B1 | 11/2001 | Westerman et al. | |
| 6,323,849 B1 | 11/2001 | He et al. | 345/173 |
| 6,347,290 B1 | 2/2002 | Barlett | |
| 6,377,009 B1 | 4/2002 | Philipp | 318/468 |
| 6,380,931 B1 | 4/2002 | Gillespie et al. | |
| 6,411,287 B1 | 6/2002 | Scharff et al. | 345/177 |
| 6,414,671 B1 | 7/2002 | Gillespie et al. | |
| 6,421,234 B1 | 7/2002 | Ricks et al. | 361/683 |
| 6,452,514 B1 | 9/2002 | Philipp | 341/33 |
| 6,457,355 B1 | 10/2002 | Philipp | 73/304 |
| 6,466,036 B1 | 10/2002 | Philipp | 324/678 |
| 6,515,669 B1 | 2/2003 | Mohri | 345/474 |
| 6,525,749 B1 | 2/2003 | Moran et al. | 345/863 |
| 6,535,200 B2 | 3/2003 | Philipp | 345/168 |
| 6,543,684 B1 | 4/2003 | White et al. | 234/379 |
| 6,543,947 B2 | 4/2003 | Lee | 400/489 |
| 6,570,557 B1 | 5/2003 | Westerman et al. | |
| 6,593,916 B1 | 7/2003 | Aroyan | 345/173 |
| 6,610,936 B2 | 8/2003 | Gillespie et al. | |
| 6,624,833 B1 | 9/2003 | Kumar et al. | |
| 6,639,577 B2 | 10/2003 | Eberhard | 345/102 |
| 6,650,319 B1 | 11/2003 | Hurst et al. | 345/173 |
| 6,658,994 B1 | 12/2003 | McMillan | 99/468 |
| 6,670,894 B2 | 12/2003 | Mehring | 341/22 |
| 6,677,932 B1 | 1/2004 | Westerman | |
| 6,677,934 B1 | 1/2004 | Blanchard | 345/173 |
| 6,724,366 B2 | 4/2004 | Crawford | 345/157 |
| 6,757,002 B1 | 6/2004 | Oross et al. | 345/864 |

| | | | |
|---|---|---|---|
| 6,803,906 B1 | 10/2004 | Morrison et al. ............ | 345/173 |
| 6,842,672 B1 | 1/2005 | Straub et al. ................... | 701/3 |
| 6,856,259 B1 | 2/2005 | Sharp ............................. | 341/5 |
| 6,888,536 B2 | 5/2005 | Westerman et al. | |
| 6,900,795 B1 | 5/2005 | Knight, III et al. .......... | 345/173 |
| 6,926,609 B2 | 8/2005 | Martin ......................... | 463/36 |
| 6,927,761 B2 | 8/2005 | Badaye et al. ............... | 345/173 |
| 6,942,571 B1 | 9/2005 | McAllister et al. ............ | 463/20 |
| 6,965,375 B1 | 11/2005 | Gettemy et al. .............. | 345/173 |
| 6,972,401 B2 | 12/2005 | Akitt et al. ................... | 250/221 |
| 6,977,666 B1 | 12/2005 | Hedrick ....................... | 345/690 |
| 6,985,801 B1 | 1/2006 | Straub et al. ................... | 701/3 |
| 6,992,659 B2 | 1/2006 | Gettemy ....................... | 345/173 |
| 7,031,228 B2 | 4/2006 | Born et al. .................... | 368/69 |
| 7,075,512 B1 | 7/2006 | Fabre et al. .................. | 345/156 |
| 7,098,896 B2* | 8/2006 | Kushler et al. ............... | 345/168 |
| 2002/0118848 A1 | 8/2002 | Karpenstein ................ | 381/119 |
| 2002/0140680 A1* | 10/2002 | Lu ............................... | 345/169 |
| 2003/0006974 A1 | 1/2003 | Clough et al. ............... | 345/179 |
| 2003/0076301 A1 | 4/2003 | Tsuk et al. ................... | 345/159 |
| 2003/0076303 A1 | 4/2003 | Huppi ......................... | 345/163 |
| 2003/0076306 A1 | 4/2003 | Zadesky et al. ............. | 345/173 |
| 2003/0095095 A1 | 5/2003 | Pihlaja ........................ | 345/156 |
| 2003/0095096 A1 | 5/2003 | Robbin et al. ............... | 345/156 |
| 2003/0098858 A1 | 5/2003 | Perski et al. ................. | 345/173 |
| 2003/0193481 A1 | 10/2003 | Sokolsky | |
| 2003/0206202 A1 | 11/2003 | Moriya ........................ | 345/846 |
| 2003/0234768 A1 | 12/2003 | Rekimoto et al. ........... | 345/169 |
| 2004/0021644 A1 | 2/2004 | Enomoto | |
| 2004/0053661 A1 | 3/2004 | Jones et al. | |
| 2004/0134238 A1 | 7/2004 | Buckroyd et al. | |
| 2004/0136564 A1 | 7/2004 | Roeber et al. | |
| 2004/0160419 A1* | 8/2004 | Padgitt ........................ | 345/173 |
| 2004/0183833 A1* | 9/2004 | Chua ........................... | 345/773 |
| 2004/0263484 A1 | 12/2004 | Montysalo et al. .......... | 345/173 |
| 2005/0012723 A1 | 1/2005 | Pallakoff ..................... | 345/173 |
| 2005/0052425 A1 | 3/2005 | Zadesky et al. ............. | 345/173 |
| 2005/0104867 A1 | 5/2005 | Westerman et al. ......... | 345/173 |
| 2005/0110768 A1 | 5/2005 | Marriott et al. ............. | 345/173 |
| 2005/0134578 A1 | 6/2005 | Chambers et al. | |
| 2005/0169527 A1* | 8/2005 | Longe et al. ................ | 382/177 |
| 2006/0022955 A1 | 2/2006 | Kennedy ..................... | 345/173 |
| 2006/0022956 A1 | 2/2006 | Lengeling et al. ........... | 345/173 |
| 2006/0026521 A1 | 2/2006 | Hotelling et al. ............ | 715/702 |
| 2006/0026535 A1 | 2/2006 | Hotelling et al. ............ | 715/863 |
| 2006/0026536 A1 | 2/2006 | Hotelling et al. ............ | 715/863 |
| 2006/0032680 A1 | 2/2006 | Elias et al. ............... | 178/18.06 |
| 2006/0033724 A1 | 2/2006 | Chaudhri et al. ............ | 345/173 |
| 2006/0052885 A1* | 3/2006 | Kong ........................... | 700/84 |
| 2006/0053387 A1 | 3/2006 | Ording ....................... | 715/773 |
| 2006/0066582 A1 | 3/2006 | Lyon et al. ................... | 345/173 |
| 2006/0085757 A1 | 4/2006 | Andre et al. ................. | 715/771 |
| 2006/0097991 A1 | 5/2006 | Hotelling et al. ............ | 345/173 |
| 2006/0161846 A1* | 7/2006 | Van Leeuwen .............. | 715/702 |
| 2006/0181519 A1 | 8/2006 | Vernier et al. ............... | 345/173 |
| 2006/0197753 A1 | 9/2006 | Hotelling .................... | 345/173 |
| 2006/0274051 A1 | 12/2006 | Longe et al. ................ | 345/173 |

FOREIGN PATENT DOCUMENTS

| | | |
|---|---|---|
| DE | 100 42 300 A1 | 3/2002 |
| DE | 100 59 906 A1 | 6/2002 |
| DE | 101 40 874 A1 | 3/2003 |
| DE | 102 51 296 | 5/2004 |
| EP | 0 288 692 | 7/1993 |
| EP | 0 664 504 | 1/1995 |
| EP | 0 464 908 | 9/1996 |
| EP | 1 014 295 | 1/2002 |
| EP | 1 569 079 A1 | 8/2005 |
| EP | 1505484 A1 | 9/2005 |
| GB | 2344894 A | 6/2000 |
| GB | 2402105 A * | 12/2004 |
| JP | 10039748 | 2/1998 |
| JP | 2000163193 | 6/2006 |
| KR | 4057131 A | 7/2004 |
| WO | 97/18547 | 5/1997 |
| WO | 97/23738 | 7/1997 |
| WO | 98/14863 | 4/1998 |
| WO | WO 98/14863 | 4/1998 |
| WO | 99/28813 A1 | 6/1999 |
| WO | 99/38149 A1 | 7/1999 |
| WO | 99/54807 A1 | 10/1999 |
| WO | 00/38042 A1 | 6/2000 |
| WO | 01/02949 A1 | 1/2001 |
| WO | 02/01482 A1 | 1/2002 |
| WO | 03/088176 | 10/2003 |
| WO | 03/098421 A1 | 11/2003 |
| WO | 2005/114369 A2 | 12/2005 |
| WO | 2006/023569 | 3/2006 |
| WO | 2006/026012 A2 | 3/2006 |

OTHER PUBLICATIONS

U.S. Appl. No. 10/903,964, filed Jul. 30, 2004.
U.S. Appl. No. 10/927,925, filed Aug. 26, 2004.
U.S. Appl. No. 11/048,264, filed Jan. 31, 2005.
"Touch Technologies Overview." 3M Touch Systems, Massachusetts 2001.
Hardy, Ian. "Fingerworks." Mar. 7, 2002.
"Symbol Commander" (printed Aug. 30, 2005) http://www.sensiva.com/symbolcommander.
"Mouse Gestures in Opera" (printed Apr. 20, 2004) http://www.opera.com.features/mouse/.
"A Brief Overview of Gesture Recognition" (printed Apr. 20, 2004) http://www.dai.ed.ac.uk/Cvonline/LOCAL_COPIES/COHEN/gesture_overview.html.
Rekimoto, Jun. "SmartSkin: An Infrastructure for Freehand Manipulation on Interactive Surfaces." CHI 2002. Apr. 20-25, 2002.
"Mouse Gestures." Optim oz. May 21, 2004.
"iGesture Products for Everyone (Learn in Minutes)." FingerWorks. Aug. 30, 2005.
"MultiTouch Overview." FingerWorks. (printed Aug. 30, 2005) http://www.fingerworks.com/multoveriew.html.
"Gesture Recognition." (printed Aug. 30, 2005) http://www.fingerworks.com/gesture_recognition.html.
"Tips for Typing." FingerWorks. (printed Aug. 30, 2005) http://www.fingerworks.com/mini_typing.html.
"Mouse Emulation." FingerWorks. (printed Aug. 30, 2005).
"Touch Technologies: Touch is Everywhere." (printed Aug. 30, 2005) http://www.3m.com/3MTouchSystems/downloads/PDFs/TouchTechOV.pdf.
U.S. Appl. No. 10/654,108, filed Sep. 2, 2003 entitled "Ambidextrous Mouse".
U.S. Appl. No. 10/789,676, filed Feb. 27, 2004 entitled "Shape Detecting Input Device".
"4-Wire Resistive Touchscreens" obtained from http://www.touchscreens.com/intro-touchtypes-4resistive.html generated Aug. 5, 2005.
"5-Wire Resistive Touchscreens" obtained from http://www.touchscreens.com/intro-touchtypes-resistive.html generated Aug. 5, 2005.
"A Brief Overview of Gesture Recognition" obtained from http://www.dai.ed.ac.uk/Cvonline/LOCA_COPIES/COHEN/gesture_overview. html, generated Apr. 20, 2004.
"Capacitive Touchscreens" obtained from http://www.touchscreens.com/intro-touchtypes-capacitive.html generated Aug. 5, 2005.
"Capacitive Position Sensing" obtained from http://www.synaptics.com/technology/cps.cfm generated Aug. 5, 2005.
"Comparing Touch Technologies" obtained from http://www.touchscreens.com/intro-touchtypes.html generated Oct. 10, 2004.
"Gesture Recognition" http://www.fingerworks.com/gesture_recognition.html.
"GlidePoint®" obtained from http://www.cirque.com/technology/technology_gp.html generated Aug. 5, 2005.

"How do touchscreen monitors know where you're touching?" obtained from http://www.electronics.howstuffworks.com/question716.html generated Aug. 5, 2005.

"How does a touchscreen work?" obtained from http://www.touchscreens.com/intro-anatomy.html generated Aug. 5, 2005.

"iGesture Products for Everyone (learn in minutes) Product Overview" FingerWorks.com.

"Infrared Touchscreens" obtained from http://www.touchscreens.com/intro-touchtypes-infrared.html generated Aug. 5, 2005.

"Mouse Emulation" FingerWorks obtained from http://www.fingerworks.com/gesture_guide_mouse.html generated Aug. 30, 2005.

"Mouse Gestures in Opera" obtained from http://www.opera.com/products/desktop/mouse/index.dml generated Aug. 30, 2005.

"Mouse Gestures," Optim oz, May 21, 2004.

"MultiTouch Overview" FingerWorks obtained from http://www.fingerworks.com/multoverview.html generated Aug. 30, 2005.

"Near Field Imaging Touchscreens" obtained from http://www.touchscreens.com/intro-touchtypes-nfi.html generated Aug. 5, 2005.

"PenTouch Capacitive Touchscreens" obtained from http://www.touchscreens.com/intro-touchtypes-pentouch.html generated Aug. 5, 2005.

"Surface Acoustic Wave Touchscreens" obtained from http://www.touchscreens.com/intro-touchtypes-saw.html generated Aug. 5, 2005.

"Symbol Commander" obtained from http://www.sensiva.com/symbolcomander/, generated Aug. 30, 2005.

"Tips for Typing" FingerWorks http://www.fingerworks.com/mini_typing.html generated Aug. 30, 2005.

"Touch Technologies Overview" 2001, 3M Touch Systems, Massachusetts.

"Wacom Components—Technology" obtained from http://www.wacom-components.com/english/tech.asp generated on Oct. 10, 2004.

"Watershed Algorithm" http://rsb.info.nih.gov/ij/plugins/watershed.html generated Aug. 5, 2005.

"FingerWorks—Gesture Guide—Application Switching," obtained from http://www.fingerworks.com/gesture_guide_apps.html, generated on Aug. 27, 2004, 1-pg.

"FingerWorks—Gesture Guide—Editing," obtained from http://www.fingerworks.com/gesure_guide_editing.html, generated on Aug. 27, 2004, 1-pg.

"FingerWorks—Gesture Guide—File Operations," obtained from http://www.fingerworks.com/gesture_guide_files.html, generated on Aug. 27, 2004, 1-pg.

"FingerWorks—Gesture Guide—Text Manipulation," obtained from http://www.fingerworks.com/gesture_guide_text_manip.html, generated on Aug. 27, 2004, 2-pg.

"FingerWorks—Gesture Guide—Tips and Tricks," obtained from http://www.fingerworks.com/gesture_guide_tips.html, generated Aug. 27, 2004, 2-pgs.

"FingerWorks—Gesture Guide—Web," obtained from http://www.fingerworks.com/gesture_guide_web.html, generated on Aug. 27, 2004, 1-pg.

"FingerWorks—Guide to Hand Gestures for USB Touchpads," obtained from http://www.fingerworks.com/igesture_userguide.html, generated Aug. 27, 2004, 1-pg.

"FingerWorks—iGesture—Technical Details," obtained from http://www.fingerworks.com/igesture_tech.html, generated Aug. 27, 2004, 1-pg.

"FingerWorks—The Only Touchpads with Ergonomic Full-Hand Resting and Relaxation!" obtained from http://www.fingerworks.com/resting.html, Copyright 2001, 1-pg.

"FingerWorks—Tips for Typing on the Mini," obtained from http://www.fingerworks.com/mini_typing.html, generated on Aug. 27, 2004, 2-pgs.

"iGesture Pad—The MultiFinger USB TouchPad with Whole-Hand Gestures," obtained from http://www.fingerworks.com/igesture.html, generated Aug. 27, 2004, 2-pgs.

Bier, et al., "Toolglass and Magic Lenses: The see-through interface" In James Kijiya, editor, Computer Graphics (SIGGRAPH '93 Proceedings), vol. 27, pp. 73-80, Aug. 1993.

Douglas et al., *The Ergonomics of Computer Pointing Devices* (1997).

European Search Report received in EP 1 621 989 @ Beyer Weaver & Thomas, LLP) dated Mar. 27, 2006.

EVB Elektronik "TSOP6238 IR Receiver Modules for Infrared Remote Control Systems" dated Jan. 2004 1-pg.

Fisher et al., "Repetitive Motion Disorders: The Design of Optimal Rate- Rest Profiles," Human Factors, 35(2):283-304 (Jun. 1993).

Fukumoto, et al., "ActiveClick: Tactile Feedback for Touch Panels," In CHI 2001 Summary, pp. 121-122, 2001.

Fukumoto and Yoshinobu Tonomura, "Body Coupled Fingering: Wireless Wearable Keyboard," *CHI 97*, pp. 147-154 (Mar. 1997).

Hardy, "Fingerworks" Mar. 7, 2002; BBC World On Line.

Hillier and Gerald J. Lieberman, *Introduction to Operations Research* (1986).

International Search Report dated Mar. 3, 2006 (PCT/US 05/03325; 119-0052WO).

Jacob et al., "Integrality and Separability of Input Devices," *ACM Transactions on Computer-Human Interaction*, 1:3-26 (Mar. 1994).

Kinkley et al., "Touch-Sensing Input Devices," in CHI '99 Proceedings, pp. 223-230, 1999.

KIONX "KXP84 Series Summary Data Sheet" copyright 2005,dated Oct. 21, 2005, 4-pgs.

Lee et al., "A Multi-Touch Three Dimensional Touch-Sensitive Tablet," in CHI '85 Proceedings, pp. 121-128, 2000.

Lee, "A Fast Multiple-Touch-Sensitive Input Device," Master's Thesis, University of Toronto (1984).

Matsushita et al., "HoloWall: Designing a Finger, Hand, Body and Object Sensitive Wall," In Proceedings of UIST '97, Oct. 1997.

Quantum Research Group "QT510 / QWheel™ Touch Slider IC" copyright 2004-2005, 14-pgs.

Quek, "Unencumbered Gestural Interaction," *IEEE Multimedia*, 3:36-47 (Winter 1996).

Radwin, "Activation Force and Travel Effects on Overexertion in Repetitive Key Tapping," *Human Factors*, 39(1):130-140 (Mar. 1997).

Rekimoto "SmartSkin: An Infrastructure for Freehand Manipulation on Interactive Surfaces" CHI 2002, Apr. 20-25, 2002.

Rekimoto et al., "ToolStone: Effective Use of the Physical Manipulation Vocabularies of Input Devices," In Proc. Of UIST 2000.

Rubine et al., "Programmable Finger-Tracking Instrument Controllers," *Computer Music Journal*, vol. 14, No. 1 (Spring 1990).

Rutledge et al., "Force-To-Motion Functions For Pointing," Human-Computer Interaction— Interact (1990).

Subatai Ahmad, "A Usable Real-Time 3D Hand Tracker," Proceedings of the 28th Asilomar Conference on Signals, Systems and Computers—Part 2 (of2), vol. 2 (Oct. 1994).

Texas Instruments "TSC2003 / I2C Touch Screen Controller" Data Sheet SBAS 162, dated Oct. 2001, 20-pgs.

Wellner, "The Digital Desk Calculators: Tangible Manipulation on a Desk Top Display" In ACM UIST '91 Proceedings, pp. 27-34, Nov. 1991.

Williams, "Applications for a Switched-Capacitor Instrumentation Building Block" Linear Technology Application Note 3, Jul. 1985, pp. 1-16.

Yamada et al., "A Switched-Capacitor Interface for Capacitive Pressure Sensors" IEEE Transactions on Instrumentation and Measurement, vol. 41, No. 1, Feb. 1992, pp. 81-86.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," In CHI '85 Proceedings, pp. 280-287, 1995.

U.S. Appl. No. 10/774,053, filed Feb. 5, 2004.

U.S. Appl. No. 11/140,529 filed May 27, 2005 which is a Reissue of 6,570,557 listed above.

U.S. Appl. No. 11/381,313 filed May 2, 2006 entitled "Multipoint Touch Surface Controller".

U.S. Appl. No. 11/332,861 filed Jan. 13, 2006 which is a Reissue of 6,677,932 listed above (see A160).

U.S. Appl. No. 11/380,109 filed Apr. 25, 2006 entitled "Keystroke Tactility Arrangement On Smooth Touch Surface.".

U.S. Appl. No. 11/428,501 filed Jul. 3, 2006 entitled "Capacitive Sensing Arrangement," which is a Continuation of US 2005/0104867 listed above (see A177).

U.S. Appl. No. 11/428,503 filed Jul. 3, 2006 entitled "Touch Surface" which is a Continuation of US 2005/0104867 listed above (see A177).

U.S. Appl. No. 11/428,506 filed Jul. 3, 2006 entitled "User Interface Gestures" which is a Continuation of US 2005/0104867 listed above (see A177).

U.S. Appl. No. 11/428,515, filed Jul. 3, 2006 entitled "User Interface Gestures" which is a Continuation of US 2005/0104867 listed above (see A177).

U.S. Appl. No. 11/428,522, filed Jul. 3, 2006 entitled "Identifying Contacts on a Touch Surface" which is a Continuation of US 2005/0104867 listed above (see A177).

U.S. Appl. No. 11/428,521, filed Jul. 3, 2006 entitled "Identifying Contacts on a Touch Surface" which is a Continuation of US 2005/0104867 listed above (see A177).

U.S. Appl. No. 11/426,078, filed Jun. 23, 2006 entitled "Electronic Device Having Display and Surrounding Touch Sensitive Bezel For User Interface and Control" which is a Continuation-In-Part of 2006/0197753 listed above (see A181).

U.S. Appl. No. 11/278,080, filed Mar. 30, 2006 entitled "Force Imaging Input Device and System".

U.S. Appl. No. 11/382,402, filed May 9, 2006 entitled "Force and Location Sensitive Display" which is a Continuation of U.S. Appl. No. 11/278,080 listed above (see C81).

International Search Report received in corresponding PCT application No. PCT/US2006/008349.

Annex to Form PCT/ISA/206 Communication Relating to the Results of the Partial International Search received in corresponding PCT Application No. PCT/US2005/025641 dated Feb. 19, 2007.

PCT International Search Report received in corresponding PCT Application No. PCT/US2006/031523 dated Feb. 27, 2007.

PCT International Search Report received in corresponding PCT Application No. PCT/US2005/025657 dated Feb. 26, 2007.

PCT International Search Report received in corresponding PCT Application No. PCT/US2006/031527 dated Feb. 27, 2007.

PCT International Search Report received in corresponding PCT Application No. PCT/US2006/031526 dated Feb. 14, 2007.

Schiphorst, et al.; "Using a Gestural Interface Toolkit for Tactile Input to a Dynamic Virtual Space;" Conference on Human Factors in Computing Systems, Proceedings, Apr. 25, 2002, pp. 754-755.

Chen, et al.; "Flowfield and Beyond: Applying Pressure-Sensitive Multi-Point Touchpad Interaction," Multimedia and Expo, 2003, ICME '03, Proceedings, Jul. 9, 2003, pp. I-49-I52.

Jones; "MTC Express Multi-touch Controller" Computer Music Journal 25.1, 2001, pp. 97-99.

* cited by examiner

| | Duration < z [651] | No activation [681] |
|---|---|---|
| | Duration < x and > z [652] | Single activation [682] |
| | Duration ≥ x and Duration < y [654] | Repeated activation as function of duration [684] |
| | Duration ≥ y [656] | No activation [686] |
| 602 | 604 | 606 |

OPERATION OF A COMPUTER WITH TOUCH SCREEN INTERFACE

CROSS-REFERENCE TO RELATED APPLICATIONS

This application is a continuation-in-part of prior application Ser. No. 10/903,964, filed Jul. 30, 2004 from which priority under 35 U.S.C. §120 is claimed, which is hereby incorporated by reference in its entirety. This application is also related to the following co-pending applications: U.S. Ser. No. 10/840,862, filed May 6, 2004; U.S. Ser. No. 11/048, 264, filed Jul. 30, 2004; U.S. Ser. No. 11/038,590, filed Jul. 30, 2004; (U.S. Ser. No. 11/228,737), entitled "ACTIVATING VIRTUAL KEYS OF A TOUCH-SCREEN VIRTUAL KEYBOARD", filed concurrently herewith; and (U.S. Ser. No. 11/228,758), entitled "VIRTUAL INPUT DEVICE PLACEMENT ON A TOUCH SCREEN USER INTERFACE", filed concurrently herewith; all of which are hereby incorporated herein by reference in their entirety for all purposes.

BACKGROUND

1. Technical Field

The present patent application relates to touch screen user interfaces and, in particular, relates to operation of a computer based on interaction by a user with a virtual GUI item, such as a virtual keyboard on a touch screen user interface.

2. Description of the Related Art

A touch screen is a type of display screen that has a touch-sensitive transparent panel covering the screen, or can otherwise recognize touch input on the screen. Typically, the touch screen display is housed within the same housing as computer circuitry including processing circuitry operating under program control. When using a touch screen to provide input to an application executing on a computer, a user makes a selection on the display screen by pointing directly to graphical user interface (GUI) objects displayed on the screen (usually with a stylus or a finger).

A collection of GUI objects displayed on a touch screen may be considered a virtual keyboard. Similar to a conventional external keyboard that is not so closely associated with a display screen, the virtual keyboard includes a plurality of keys ("virtual keys"). Activation of a particular virtual key (or combination of virtual keys) generates a signal (or signals) that is provided as input to an application executing on the computer.

Touch screen keyboards, by nature of the hardware on which they operate, typically glean much more information about a user's actions than can be gleaned with a typical external keyboards. For example, whereas a typical external keyboard includes a single "sensor" (such as a mechanical switch or electrical connection) or a small number of sensors per key, touch screen keyboards typically have many more sensors per virtual key.

It is desirable to use the information about a user's actions to make the user experience with the computer, via the touch screen virtual keyboard, more powerful than is usual (or, perhaps, even possible) with computers using external keyboards.

On the other hand, even touch screens, with their numerous sensors, typically lack the ability to directly glean some types of information about a user's actions. It is desirable to use the information available to infer other types of information, for example, information which cannot be directly gleaned about the user's actions.

SUMMARY

A touch screen computer executes an application. A method of operating the touch screen computer in response to a user is provided. A virtual input device is provided on the touch screen. The virtual input device comprises a plurality of virtual GUI items (which may be, in some specific examples, virtual keys of a virtual keyboard). It is detected that a user has touched the touch screen to nominally activate at least one virtual GUI item (e.g., virtual key), and a behavior of the user with respect to touch is determined. The determined behavior is processed and a predetermined characteristic is associated with the nominally-activated at least one virtual GUI item. A reaction to the nominal activation is determined based at least in part on a result of processing the determined behavior.

DETAILED DESCRIPTION

Examples and aspects are discussed below with reference to the figures. However, it should be understood that the detailed description given herein with respect to these figures is for explanatory purposes only, and not by way of limitation.

Figure 1:
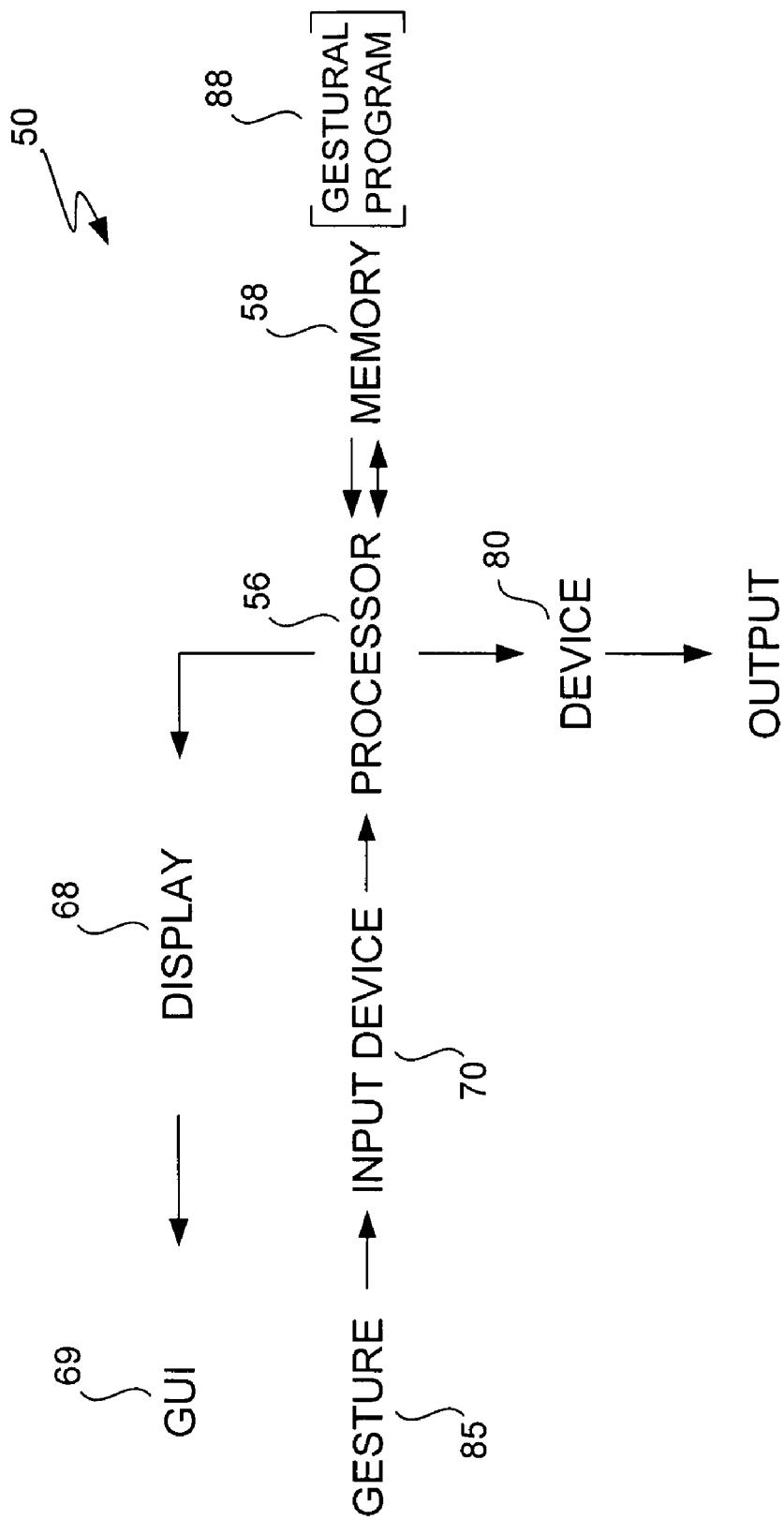
FIG. 1 is a block diagram of an exemplary touch-screen based computer system, in accordance with one embodiment of the present invention

FIG. 1 is a block diagram of an exemplary computer system 50, in accordance with one embodiment of the present invention. The computer system 50 may correspond to a personal computer system, such as a desktop computer system, a laptop computer system, a tablet computer system or a handheld computer system. The computer system may also correspond to a computing device, such as a cell phone, PDA, dedicated media player, consumer electronic device, and the like.

The exemplary computer system 50 shown in FIG. 1 includes a processor 56 configured to execute instructions and to carry out operations associated with the computer system 50. For example, using instructions retrieved for example from memory, the processor 56 may control the reception and manipulation of input and output data between components of the computing system 50. The processor 56 can be implemented on a single-chip, multiple chips or multiple electrical components. For example, various architectures can be used for the processor 56, including dedicated or embedded processor, single purpose processor, controller, ASIC, and so forth.

In most cases, the processor 56 together with an operating system operates to execute computer code and produce and use data. Operating systems are generally well known and will not be described in greater detail. By way of example, the operating system may correspond to OS/2, DOS, Unix, Linux, Palm OS, and the like. The operating system can also be a special purpose operating system, such as may be used for limited purpose appliance-type computing devices. The operating system, other computer code and data may reside within a memory block 58 that is operatively coupled to the processor 56. Memory block 58 generally provides a place to store computer code and data that are used by the computer system 50. By way of example, the memory block 58 may include Read-Only Memory (ROM), Random-Access Memory (RAM), hard disk drive and/or the like. The information could also reside on a removable storage medium and loaded or installed onto the computer system 50 when needed. Removable storage mediums include, for example, CD-ROM, PC-CARD, memory card, floppy disk, magnetic tape, and a network component.

The computer system 50 also includes a display device 68 that is operatively coupled to the processor 56. The display device 68 may be a liquid crystal display (LCD) (e.g., active matrix, passive matrix and the like). Alternatively, the display device 68 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 68 is generally configured to display a graphical user interface (GUI) 69 that provides an easy to use interface between a user of the computer system and the operating system or application running thereon. Generally speaking, the GUI 69 represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI 69 can additionally or alternatively display information, such as non interactive text and graphics, for the user on the display device 68.

The computer system 50 also includes an input device 70 that is operatively coupled to the processor 56. The input device 70 is configured to transfer data from the outside world into the computer system 50. The input device 70 may for example be used to perform tracking and to make selections with respect to the GUI 69 on the display 68. The input device 70 may also be used to issue commands in the computer system 50. The input device 70 may include a touch sensing device configured to receive input from a user's touch and to send this information to the processor 56. By way of example, the touch-sensing device may correspond to a touchpad or a touch screen. In many cases, the touch-sensing device recognizes touches, as well as the position and magnitude of touches on a touch sensitive surface. The touch sensing means reports the touches to the processor 56 and the processor 56 interprets the touches in accordance with its programming.

For example, the processor 56 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

The input device 70 may be a touch screen that is positioned over or in front of the display 68. The touch screen 70 may be integrated with the display device 68 or it may be a separate component. The touch screen 70 has several advantages over other input technologies such as touchpads, mice, etc. For one, the touch screen 70 is positioned in front of the display 68 and therefore the user can manipulate the GUI 69 directly. For example, the user can simply place their finger over an object to be controlled. In touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens. In addition to being a touch screen, the input device 70 can be a multipoint input device. Multipoint input devices have advantages over conventional singlepoint devices in that they can distinguish more than one object (finger). Singlepoint devices are simply incapable of distinguishing multiple objects. By way of example, a multipoint touch screen, which can be used herein, is shown and described in greater detail in copending and commonly assigned U.S. patent application Ser. No. 10/840, 862, which is hereby incorporated herein by reference.

The computer system 50 also includes capabilities for coupling to one or more I/O devices 80. By way of example, the I/O devices 80 may correspond to keyboards, printers, scanners, cameras, speakers, and/or the like. The I/O devices 80 may be integrated with the computer system 50 or they may be separate components (e.g., peripheral devices). In some cases, the I/O devices 80 may be connected to the computer system 50 through wired connections (e.g., cables/ports). In other cases, the I/O devices 80 may be connected to the computer system 80 through wireless connections. By way of example, the data link may correspond to PS/2, USB, IR, RF, Bluetooth or the like.

Particular processing within a touch-screen based computer is now described, where the processing accomplishes execution of an application as well as providing a display on the touch screen of the computer. The display processing includes providing a composite display that has characteristics based on the application display as well as characteristics relative to a virtual input device. The virtual input device display includes at least an input portion, to receive appropriate touch input to the touch screen relative to the displayed input device, for a user to interact with the virtual input device. The user interaction with the virtual input device includes activating portions of the virtual input device to provide user input to affect the application processing. The virtual input device (i.e., processing on the computer to accomplish the virtual input device) processes the user interaction and, based on the processing, provides the corresponding user input to the application.

The virtual input device display is typically highly correlated to the virtual input device processing of user interaction with the virtual input device. For example, if the virtual input device is a virtual keyboard, the virtual input device display may include a graphic representation of the keys of a typical QWERTY keyboard, whereas virtual input device processing of user interaction with the virtual keyboard includes determining which virtual keys have been activated by the user and providing corresponding input (e.g., letters and/or numbers) to the application.

Figure 2:
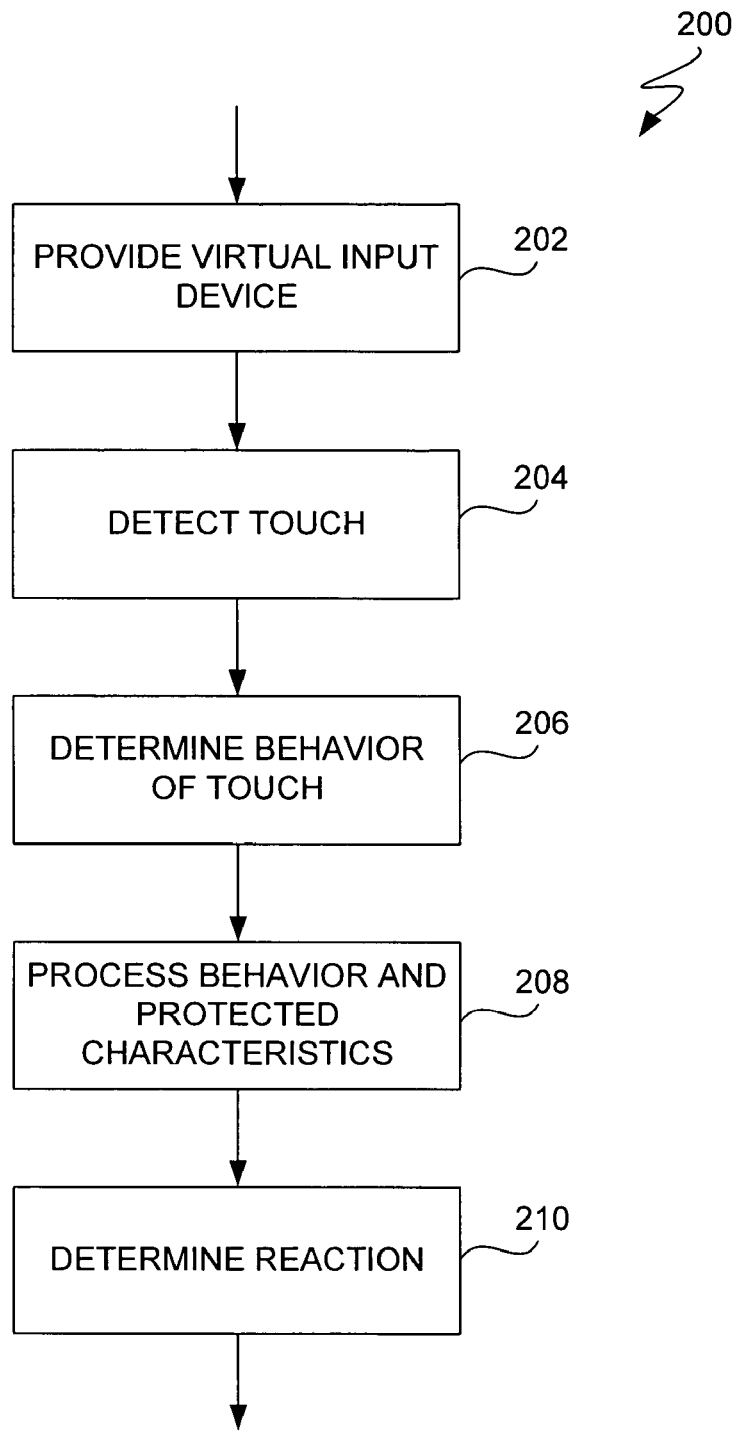
FIG. 2 is a flow chart broadly illustrating a method by which behavior of a user's touch, with respect to a virtual input device displayed on a touch screen of a multipoint sensing device, is processed to affect a reaction to the user's touch.

We now turn to FIG. 2, which is a flow chart illustrating a broad aspect of the invention. In particular, the FIG. 2 flow chart broadly illustrates a method by which behavior of a user's touch, with respect to a virtual input device displayed on a touch screen of a multipoint sensing device, is processed to affect a reaction to the user's touch. At step 202, the virtual input device is provided on the touch screen. The virtual input device may be, for example, a virtual QWERTY-style keyboard or other input device having virtual keys.

At step 204, a user's touch on the multipoint sensing device, to nominally activate a virtual key, is detected. Detecting a user's touch may be conventional. At step 206, the "behavior" of the user's touch is determined. The behavior is typically determined by processing signals created by the multipoint sensing device in response to the user's touch. Behaviors may be, for example, in the spatial domain (i.e., where on the multipoint sensing device the user touched to nominally activate the virtual key) or in the time domain (i.e., with what timing the user touched the multipoint sensing device to nominally activate the virtual key) and a combination of both spatial and time domain.

At step 208, the determined behavior and predetermined characteristics associated with the nominally-activated virtual key are processed. At step 210, based on the processing in step 208, a reaction is determined to activation of the nominally-activated virtual key. Examples of predetermined characteristics are illustrated later in this description. Broadly speaking, however, the predetermined characteristics for a virtual key are characteristics associated with particular behaviors or ranges of behaviors of a user's touch to-nominally activate that virtual key.

Figure 3:
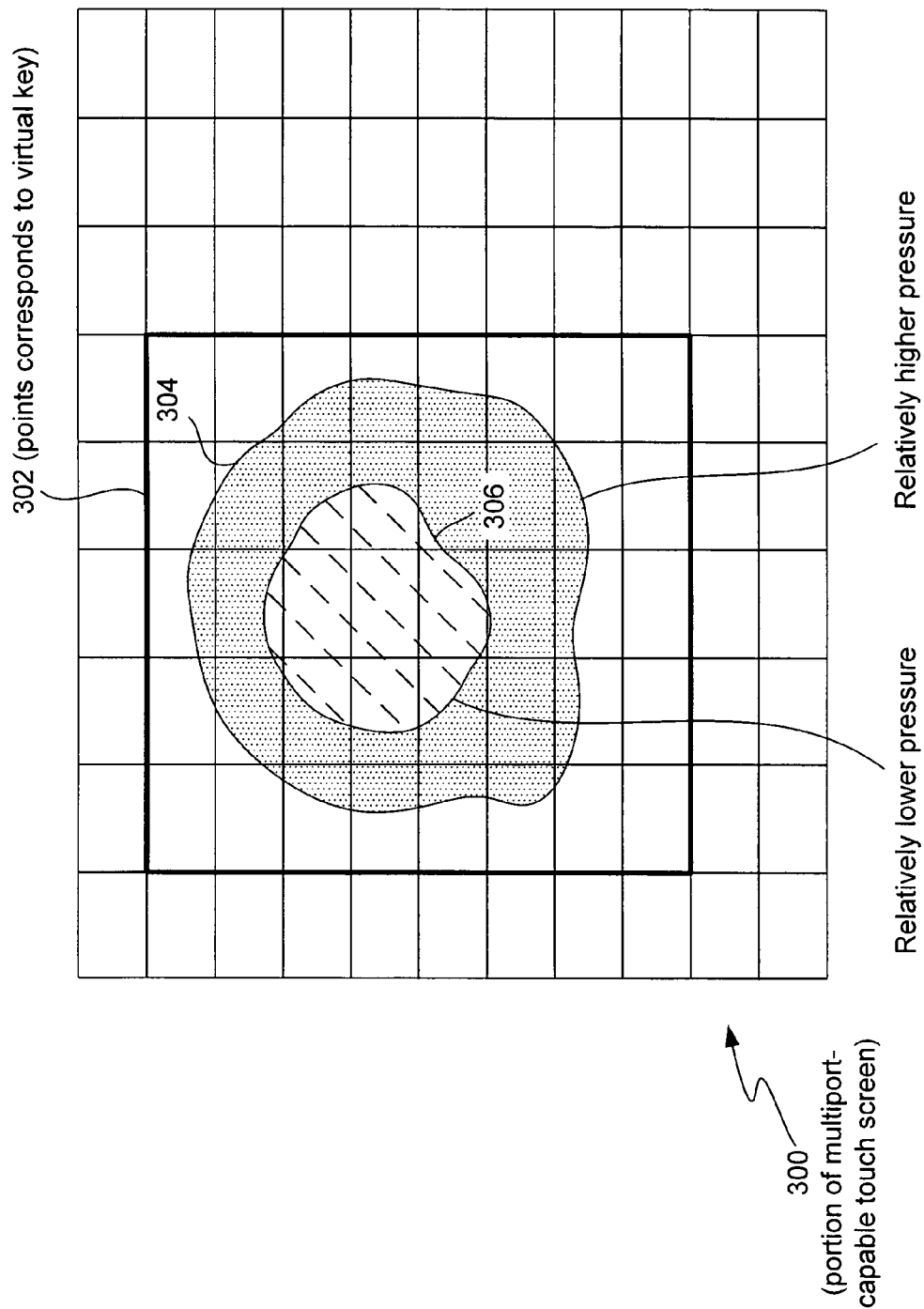
FIG. 3 illustrates using processing signals created by the multipoint sensing device in response to the user's touch in order to infer the pressure with which the user's touched the touch screen to activate a nominally-activated virtual key.

FIG. 3 illustrates using processing signals created by the multipoint sensing device in response to the user's touch in order to infer the pressure with which the user's touched the touch screen to activate a nominally-activated virtual key. Such processing is useful in the case where a pressure signal is not directly available from the touch screen, or to supplement a pressure signal that is directly available from the touch screen. The area 302 represents points on the touch screen that correspond to a particular virtual key. While the area 302 is a square, virtual keys need not be limited to being a particular shape.

Area 306 indicates (in a spatial domain) points on a touch screen that a user touched to nominally activate the virtual key of area 302. Similarly, area 304 indicates points on the touch screen that a user touched to nominally activate the virtual key of area 302. Which points are touched may be determined, for example, from the processing signals created by the multipoint sensing device in response to the user's touch.

Since area 304 encompasses more points than area 306, the touch corresponding to area 304 was with greater pressure than the touch corresponding to area 306. Furthermore, an indication of the actual pressure with which a virtual key is nominally activated may be inferred from the area corresponding to the user's touch.

While FIG. 3 illustrates all of the points within areas 304 and 306 fall within the area 302, this need not necessarily be the case. Furthermore, while FIG. 3 illustrates using the user's behavior in the spatial domain to infer pressure with which a virtual key is nominally activated, in some examples, the user's behavior in the time domain may be used to infer pressure with which a virtual key is nominally activated. In other examples, a combination of the user's behavior in the spatial domain and the time domain may be used to infer pressure with which a virtual key is nominally activated.

Having described one particular example of behavior of a user's touch of a touch screen to nominally activate a virtual key, we now describe one example of processing to process the determined behavior with which the user nominally activates a virtual key and predetermined characteristics for the nominally-activated virtual key.

Figure 4:
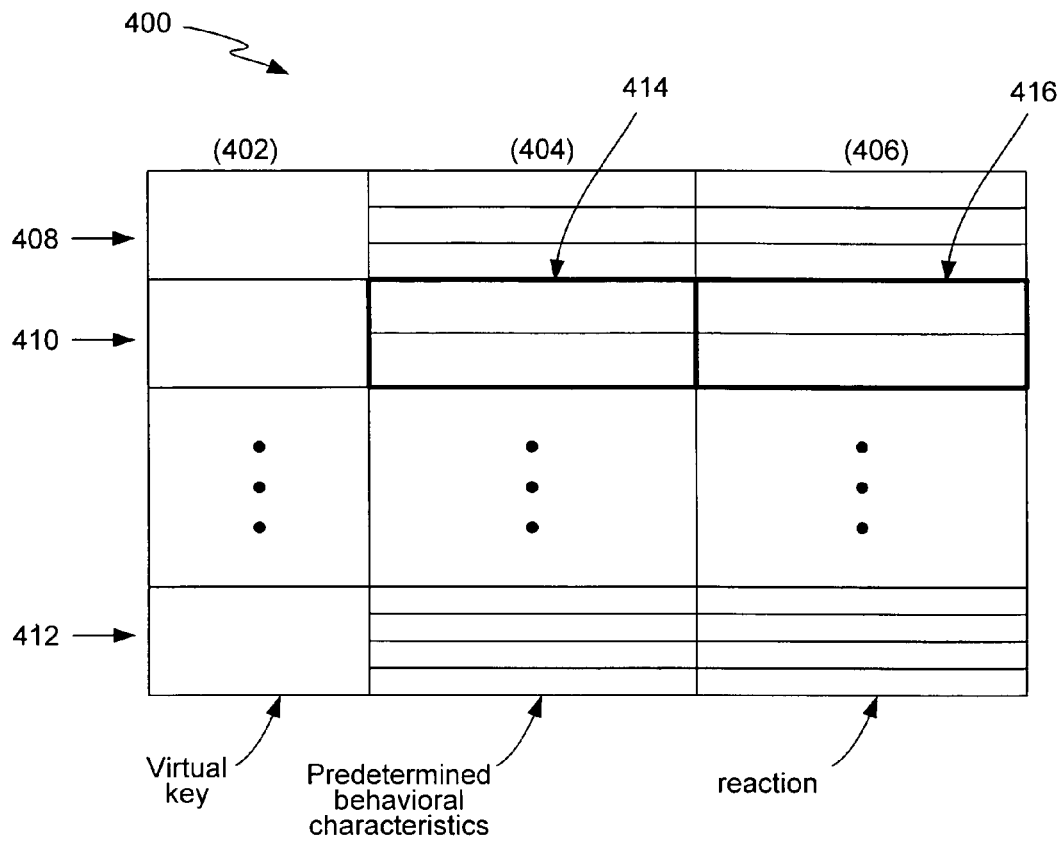
FIG. 4 illustrates a table data structure useable to determine reactions based on matching predetermined behavioral characteristics to actual behavioral characteristics with respect to nominally-activating particular virtual keys.

Referring to FIG. 4, this figure illustrates a table in which each row is for a different one of a plurality of virtual keys. For example, row 408 is for one virtual key; row 410 is for another virtual key; and row 412 is for yet another virtual key. Column 402 includes indications of the virtual keys. Column 404 includes indications of predetermined behavioral characteristics for the virtual keys.

The predetermined behavioral characteristics are discussed in detail later. Broadly speaking, the predetermined behavioral characteristics are predetermined values of user's behavior (for example, specific values or ranges of values) in the spatial domain, the time domain or both. Using the FIG. 3 example, predetermined behavioral characteristics indicated in column 404 may include, for example, specific values of inferred pressure of a user's touch of a touch screen to nominally activate a virtual key indicated in column 402. As another example, the predetermined characteristics indicated in column 404 may include ranges of values of inferred pressure of a user's touch of the touch screen to nominally activate a virtual key indicated in column 402.

The column 406 includes indications of reactions corresponding to the predetermined characteristics indicated in column 404. That is, each reaction indicated in column 406 is an action to be taken (or, in some cases, not taken) when a determined behavior is matched to a particular predetermined behavioral characteristic in column 404.

An example of processing to determine a reaction with respect to particular user behavior is now described with reference to the flowchart in FIG. 5. For ease of illustration, the operation of the FIG. 5 example is discussed with respect to the FIG. 4 table, and with respect to a particular nominally-activated key, although the method illustrated in the FIG. 5 flowchart is not limited to being used with respect to a data structure of the form shown in FIG. 4.

Figure 5:
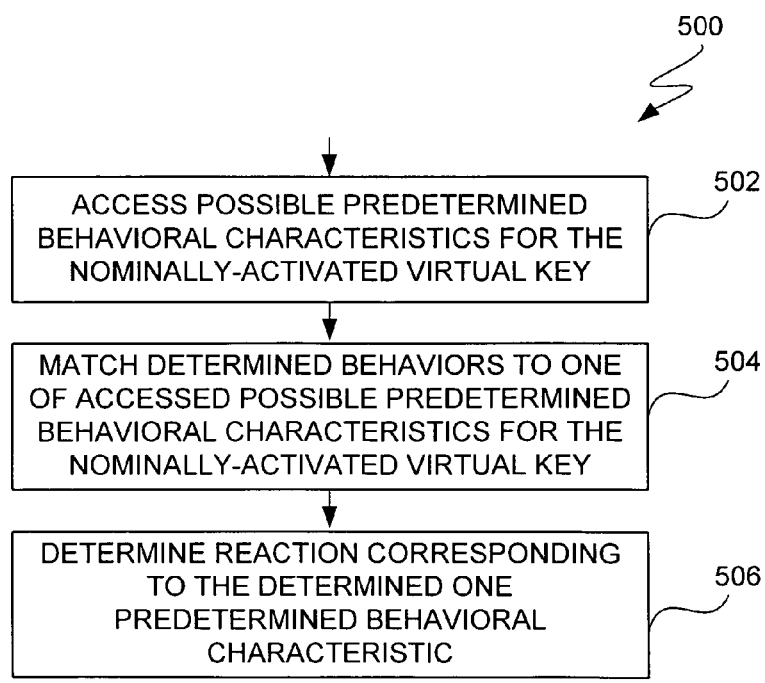
FIG. 5 is a flowchart illustrating an example of processing to determine a reaction with respect to particular user behavior.

Turning now to FIG. 5, at step 502, the possible predetermined behavioral characteristics in column 404 for the particular nominally-activated virtual key (in column 402) are accessed. For example, the particular nominally-activated key may be indicated in the entry where row 410 intersects with column 402. The accessed possible predetermined behavioral characteristics would then be within the rectangle 414.

At step 504, the determined behavior (i.e., the behavior of the user's touch in the spatial and/or time domain) is matched to the possible predetermined behavioral characteristics indicated in column 404. Then, in step 506, based on the matching, a reaction from column 406 is determined. Using the example of row 410, the determined reaction would be one of the reactions indicated within the rectangle 416.

Figures 6A, 6B:
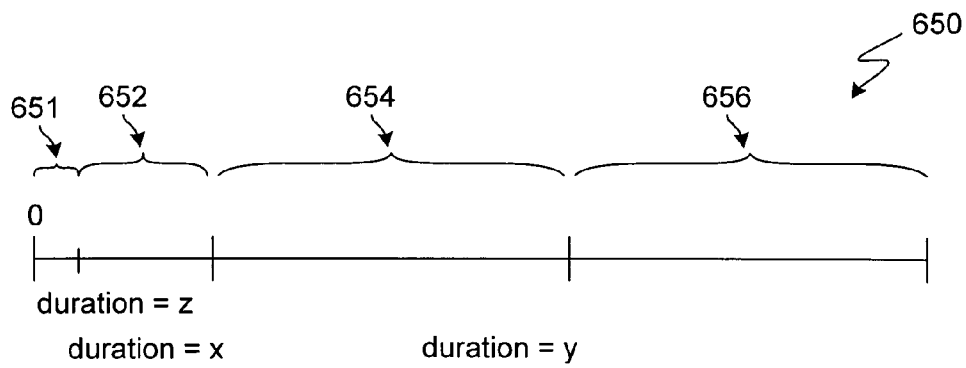
FIG. 6A illustrates a timeline corresponding to "durations" of user behavior in the temporal domain.
FIG. 6B illustrates a table data structure similar to the table illustrated in FIG. 4, to determine reactions based on user behaviors with respect to "durations" such as are illustrated in FIG. 6A.

We now discuss in greater detail, with reference to FIGS. 6A and 6B, what may be the predetermined behavioral characteristics indicated, for example, in column 404 of the FIG. 4 table and corresponding determined reactions. In the example of FIGS. 6A and 6B, the predetermined behavioral characteristics are in the time domain only and, specifically, are durations (here, ranges of durations) of the user's touch of the touch screen to nominally activate a virtual key.

FIG. 6A illustrates a timeline 650, with increasing duration from left to right. Various durations are indicated on the timeline, including "z", "x" and "y," from left to right. Reference numeral 651 indicates a duration less than "z." Reference numeral 652 indicates a duration greater than or equal to "z" and less than "x." Reference numeral 654 indicates a duration greater than or equal to "x" and less than "y." Finally, reference numeral 656 indicates a duration greater than or equal to FIG. 6B illustrates a portion of a table similar to the table illustrated in FIG. 4. The column 602 includes the entry for one particular nominally-activated virtual key. The column 604 includes entries for the predetermined behavioral characteristics. In the FIG. 6B example, the column 604 includes entries for the durations 651, 652, 654 and 656 denoted on the FIG. 6A timeline 650.

As discussed with reference to FIG. 5, the predetermined behavioral characteristics are matched to the determined behavior of the user's touch that nominally activates the virtual key. Based on the match, a reaction is determined. Column 606 of the FIG. 6B table portion includes indications of such reactions.

The reaction indications in column 606 are indicated by reference numerals 681, 682, 684 and 686; corresponding to the predetermined behavioral characteristics indicated by reference numerals 651, 652, 654 and 656. Referring to the specific reaction indications in column 606, the reaction indication 681 indicates that the nominally-activated virtual key is to not, in fact, be activated. That is, the duration of the touching is too short to indicate an actual activation of the virtual key. Similarly, the reaction indication 686 indicates that the nominally-activated virtual key is to not be actually activated. In this case, the duration of the touching is too long, presumably corresponding to a resting finger or hand part and not to an intentional activation.

The remaining reaction indications are the reaction indication 682 and the reaction indication 684. The reaction indication 682 indicates that the nominally-activated key is to be actually activated a single time. The reaction indication 684 indicates that the nominally-activated key is to be actually activated repeated times, with the number of times to repeat the actual activation a function of the duration of the touching.

FIG. 6A and FIG. 6B illustrate a simple example of determining reactions based on a determined behavior of the user in the time domain. As discussed above, reactions may be determined based on determined behaviors in the spatial domain, and based on a combination of determined behaviors in the spatial domain and in the time domain. The number and range of determined behaviors that may be used to determine reactions is limited, to some extent, only by what behavioral characteristics can be discerned or inferred.

A determined behavior in the spatial domain—inferred pressure—was discussed above with reference to FIG. 3. Other possible behaviors in the spatial domain include, for example, the area of the touch of a nominally-activated virtual key relative to the area of the touch of an adjacent such virtual key (i.e., there is not a "direct hit" of the user's finger in touching a virtual key). Possible behaviors that are in a combination of the spatial domain and the time domain are referred to, in some instances, as "gestures." See, for example, co-pending U.S. patent application Ser. No. 10/903,964, entitled GESTURES FOR TOUCH SENSITIVE INPUT DEVICES and filed Jul. 30, 2004.

Furthermore, the possible reactions, too, are somewhat limitless. Particularly where possible reactions are common possible reactions (such as, for example, a single activation or repeated activations), the reaction indication entry may be a link to a repository of such common possible reactions.

In some examples, the possible reactions and/or the predetermined behavioral characteristics may be user configurable, for example, using a menu or other utility. In some examples the possible reactions and/or the predetermined behavioral characteristics are automatically and dynamically configurable, based on the ongoing determined behavior of the user.

Figure 9:
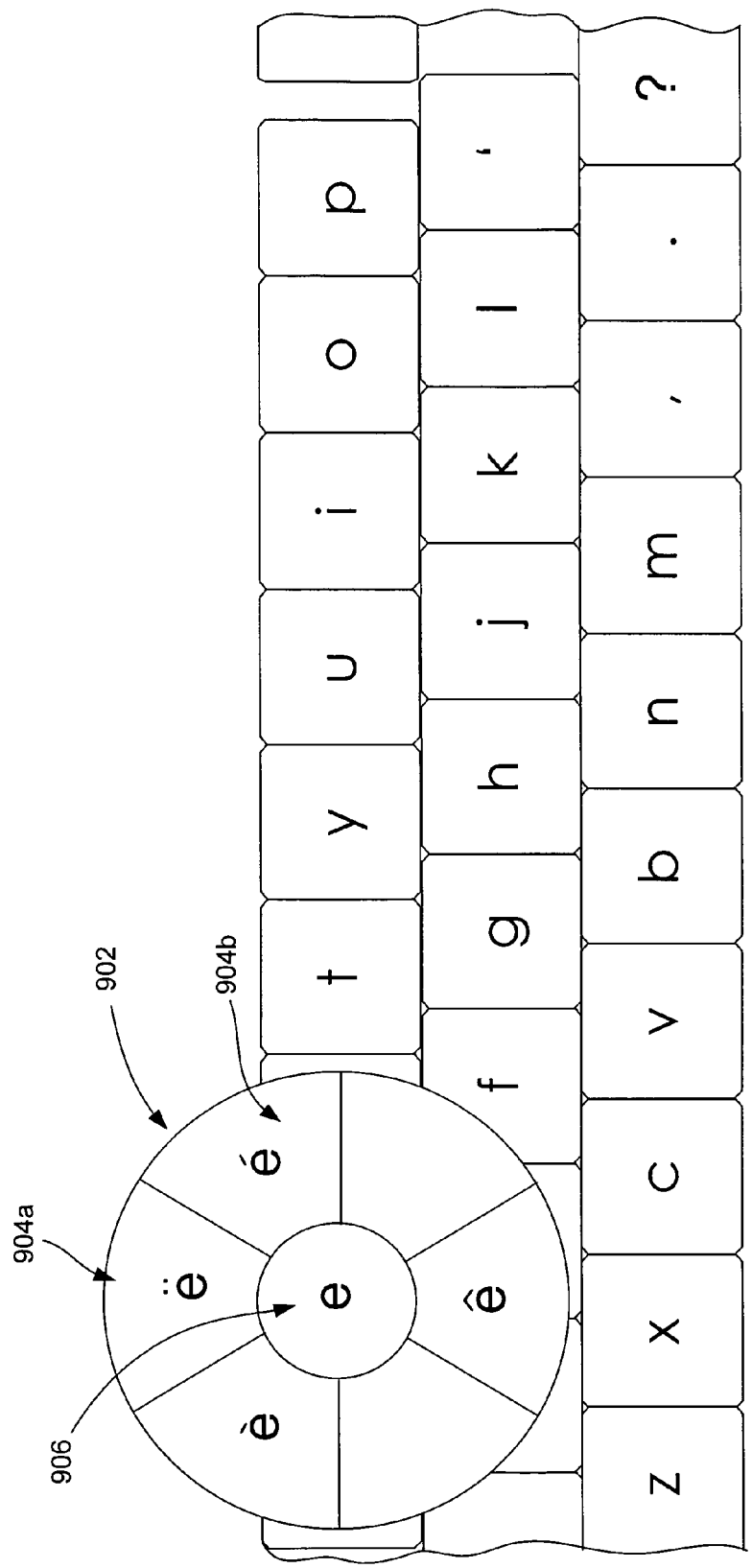
FIG. 9 illustrates a possible reaction to a nominal virtual key activation is display of a menu.

FIG. 9 illustrates a possible reaction is display of a menu 902. For example, the user may activate the "e" virtual key 906 with a particular behavior, and the reaction includes display of the menu 902. The menu 902, in the FIG. 9 illustration, includes additional virtual keys (e.g., 904a and 904b) corresponding to different forms of "e." In some examples, actual display of the menu 902 is bypassed based on particular behaviors, although the virtual keys of the menu 902 are still present and able to be activated. For example, the user may nominally activate the "e" virtual key 906 with a "brush" gesture toward the additional virtual key 904 that is desired to be activated. The user would know the location of the additional virtual keys 904 based, for example, on previous use operation of the virtual keyboard. Not displaying the menu 902, a shortcut is provided for activating the additional virtual keys 904.

Figure 7:
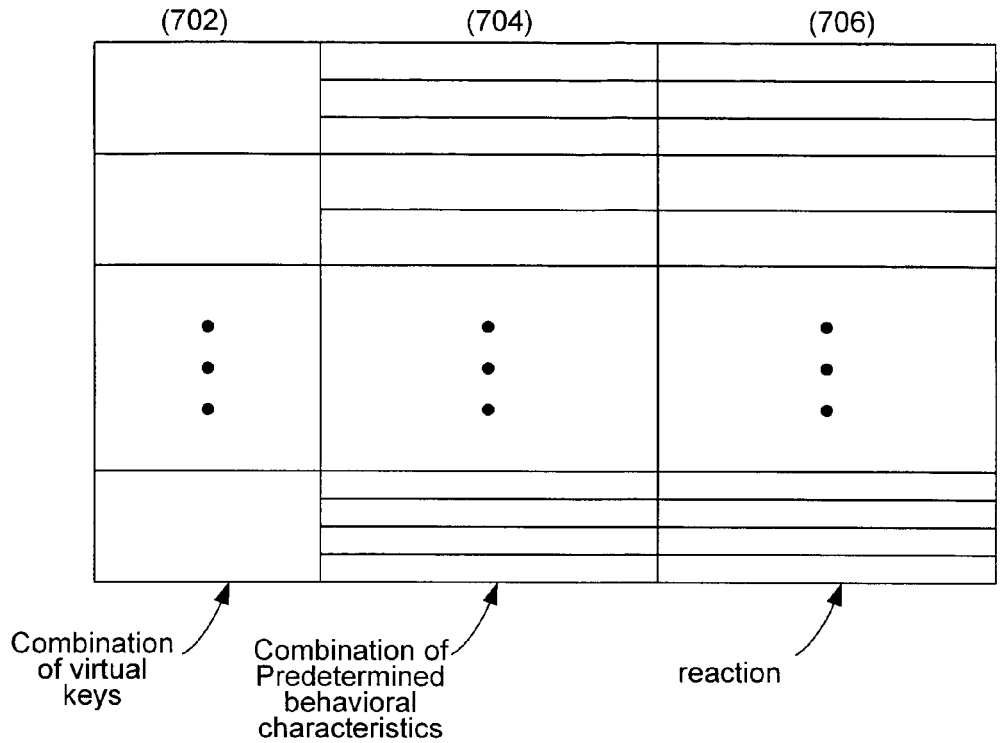
FIG. 7 illustrates a table structure for determining reactions based on user behavior with respect to nominally activating combinations of virtual keys.
Figure 8:
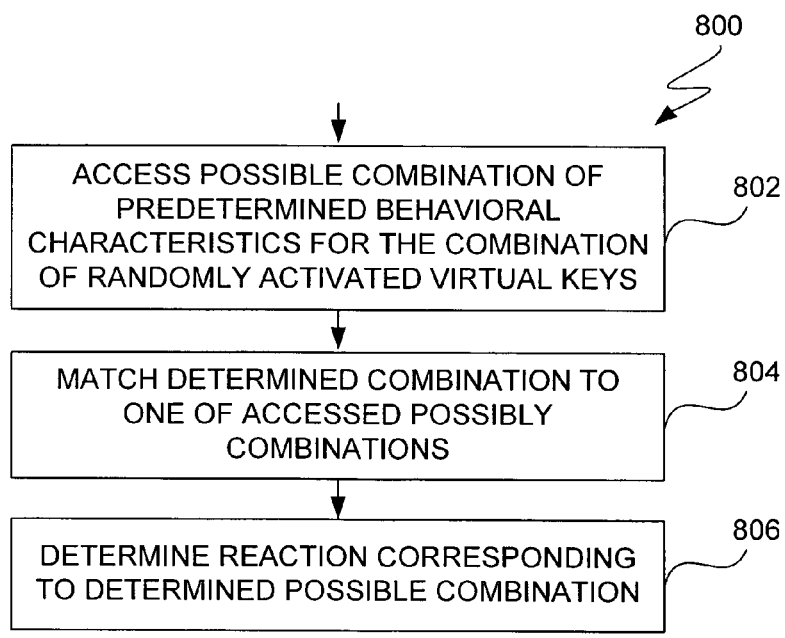
FIG. 8 is a flow chart illustrating an example of processing to determine a reaction with respect to particular user behavior with respect to nominally activating combinations of virtual keys.

We now discuss, with reference to FIG. 7 and FIG. 8, an example where a combination of virtual keys is nominally activated. This example is similar in many ways to the example discussed above with reference to FIG. 5 and FIGS. 6A and 6B. Referring first to FIG. 7, the column 702 includes entries for combinations of nominally-activated virtual keys. For example, one such entry in column 702 may be for a virtual key corresponding to an "a" in combination with a virtual key corresponding to a "SHIFT."

Each single possible combination of nominally-activated keys need not have a separate entry in the column 702. Where the combinations of predetermined behavioral characteristics in column 704 and the possible reactions in column 706 have common characteristics for plural combinations of nominally-activated virtual keys, the entries in column 704 and/or column 706 may be common to the plural combinations of predetermined behavioral characteristics, and parameterized if necessary to accommodate unique attributes associated with particular ones of the combinations of nominally-activated virtual keys.

Typically, many combinations of virtual keys do not have corresponding entries, such combinations typically resulting from inadvertent touching of the combinations of virtual keys. For a combination that does not have a corresponding entry, there would be no reaction to the combination. As another example, the such combinations may have corresponding entries, and the reaction would be "no reaction" or a reaction to generate an alert (e.g., a "beep" or other alert) to the user.

Referring to FIG. 8, the flowchart 800 illustrates an example of processing to determine a reaction with respect to particular user behavior relative to a combination of nominally-activated virtual keys. While not so limited, the operation of the FIG. 8 processing is described with reference to the data structure illustrated in FIG. 7.

At step 802, the possible predetermined behavioral characteristics in column 704 for the particular combination of nominally-activated virtual keys (in column 702) are accessed. At step 804, the determined behavior (i.e., the behavior of the user's touch in the spatial and/or time domain) is matched to the possible predetermined behavioral characteristics indicated in column 704. Then, in step 806, based on the matching, a reaction from column 706 is determined.

Figure 10:
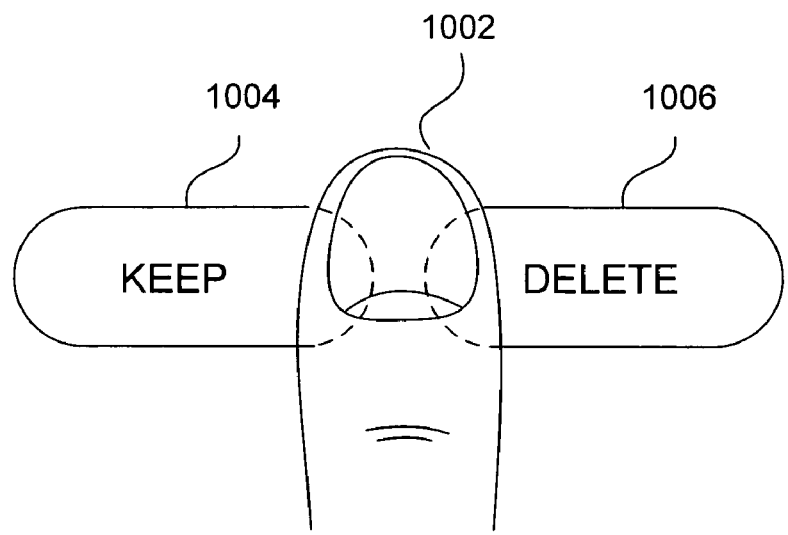
FIG. 10 illustrates an example of a display having GUI items that are not virtual keys.

FIG. 10 illustrates an example of a display having virtual GUI items that are not virtual keys of a virtual keyboard. The general concepts discussed above with the specific example of virtual keys of a virtual keyboard are generally applicable to virtual GUI items. For example, less pressure and/or shorter duration of touching (e.g., by a finger 1002) may be required to activate the "keep" virtual GUI item 1004 than to activate the "delete" virtual GUI item 1006. In addition, the processing may be such that activation of some GUI items (such as the "delete" GUI item, for example) require additional behavior, such as a "wiggle" or other gesture, which would serve as additional confirmation that it is intended for the GUI item to be activated.

In some examples, the combination is "registered" only upon a particular conditions, such as one virtual key of the combination being released.

Figure 11:
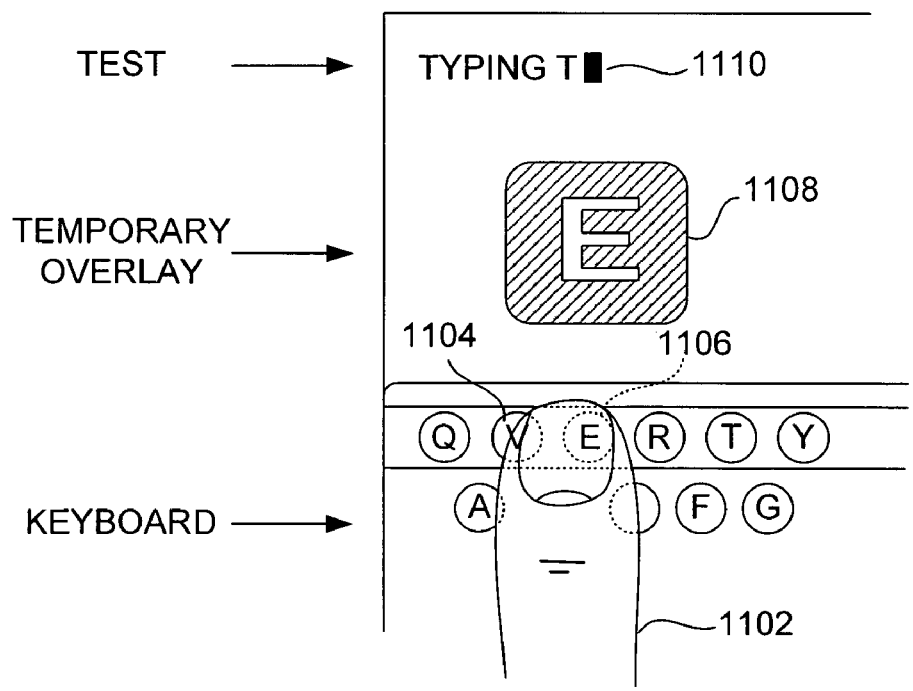
FIG. 11 illustrates a "preview" function where a temporary overlay indicates that an "e" virtual key is to be activated.

In some examples, a "preview" function is provided. Thus, for example, before a virtual GUI item's activation is committed, an indication of the activation is displayed. This may be particularly useful, for example, where the virtual GUI items are particularly small. FIG. 11 illustrates a finger 1102 whose touch 1106 may be activating either the "w" virtual key or the "e" virtual key. The temporary overlay 1108 displays an indication that the "e" virtual key is to-be activated, before the "e" virtual key activation is committed as typed text 1110. For example, the finger 1102 being lifted while a particular virtual key is indicated as being to be activated may cause the particular virtual key to actually be activated. In the FIG. 11 example, if the "e" virtual key is not to be activated, then the finger 1102 may be moved (e.g., without lifting it) on the touch screen to activate a different virtual key.

The various aspects, features, embodiments or implementations of the invention described above can be used alone or in various combinations. The invention is preferably implemented by software, but can also be implemented in hardware or a combination of hardware and software. The invention can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The advantages of the invention are numerous. Different embodiments or implementations may, but need not, yield one or more of the disclosed advantages. As set forth above, one advantage of the invention is that how a touch screen computer reacts to a user's touch to a virtual keyboard provided on the touch screen can be based on a deep appreciation for the behavior with which the user touches the touch screen. Another advantage of the invention is that how the touch screen computer reacts to the user's touch can be highly configurable.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
   at a computing device with a multipoint sensing touch screen display, a processor, and a memory:
   detecting a touch by a user on the multipoint sensing touch screen display;
   determining a behavior of the user's touch by processing signals created by the multipoint sensing touch screen display in response to the user's touch, wherein the behavior includes spatial domain behavior and time domain behavior;
   accessing a data structure in the memory, the data structure comprising data representing:
      a plurality of virtual keys; and
      for each virtual key in the plurality of virtual keys:
         a plurality of predetermined behavioral characteristics, wherein each predetermined behavioral characteristic in the plurality of predetermined behavioral characteristics includes predetermined values of behavior in the spatial domain and/or time domain; and
         a respective reaction for each respective predetermined behavioral characteristic in the plurality of predetermined behavioral characteristics;
   matching the determined behavior of the user's touch to a predetermined behavioral characteristic for a virtual key;
   determining a reaction for the virtual key in the data structure that corresponds to the matched predetermined behavioral characteristic for the virtual key; and
   performing an action that corresponds to the determined reaction,
   wherein a first virtual key in the plurality of virtual keys requires a first pressure to be activated, a second virtual key in the plurality of virtual keys requires a second pressure to be activated, and the first pressure is less than the second pressure, and
   wherein the first virtual key is adjacent to the second virtual key.

2. A method comprising:
   at a computing device with a multipoint sensing touch screen display, a processor, and a memory;
   detecting a touch by a user on the multipoint sensing touch screen display;
   determining a behavior of the user's touch by Processing signals created by the multipoint sensing touch screen display in response to the user's touch, wherein the behavior includes spatial domain behavior and time domain behavior;
   accessing a data structure in the memory, the data structure comprising data representing:
      a plurality of virtual keys; and
      for each virtual key in the plurality of virtual keys:
         a plurality of predetermined behavioral characteristics, wherein each predetermined behavioral characteristic in the plurality of predetermined behavioral characteristics includes predetermined values of behavior in the spatial domain and/or time domain; and
         a respective reaction for each respective predetermined behavioral characteristic in the plurality of predetermined behavioral characteristics;
   matching the determined behavior of the user's touch to a predetermined behavioral characteristic for a virtual key;
   determining a reaction for the virtual key in the data structure that corresponds to the matched predetermined behavioral characteristic for the virtual key; and
   performing an action that corresponds to the determined reaction,
   wherein a first virtual key in the plurality of virtual keys requires a first pressure to be activated, a second virtual key in the plurality of virtual keys requires a second pressure to be activated, and the first pressure is less than the second pressure, and
   wherein the second virtual key is a delete key.

3. A method comprising:
   at a computing device with a multipoint sensing touch screen display, a processor, and a memory:
   detecting a touch by a user on the multipoint sensing touch screen display;
   determining a behavior of the user's touch by processing signals created by the multipoint sensing touch screen display in response to the user's touch, wherein the behavior includes spatial domain behavior and time domain behavior;
   accessing a data structure in the memory, the data structure comprising data representing:
      a plurality of virtual keys; and
      for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

matching the determined behavior of the user's touch to a predetermined behavioral characteristic for a virtual key;

determining a reaction for the virtual key in the data structure that corresponds to the matched predetermined behavioral characteristic for the virtual key; and performing an action that corresponds to the determined reaction, wherein a first virtual key in the plurality of virtual keys requires a first pressure to be activated, a second virtual key in the plurality of virtual keys requires a second pressure to be activated, and the first pressure is less than the second pressure, and wherein activation of the second virtual key requires detection of an additional confirmation gesture.

4. The method of claim 3, wherein the additional confirmation gesture is a wiggle gesture.

5. A method, comprising:

at a computing device with a multipoint sensing touch screen display, a processor, and a memory:

detecting a touch by a user on the multipoint sensing touch screen display;

determining a behavior of the user's touch by processing signals created by the multipoint sensing touch screen display in response to the user's touch, wherein the behavior includes spatial domain behavior and time domain behavior;

accessing a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

matching the determined behavior of the user's touch to a predetermined behavioral characteristic for a virtual key;

determining a reaction for the virtual key in the data structure that corresponds to the matched predetermined behavioral characteristic for the virtual key; and performing an action that corresponds to the determined reaction, wherein a first virtual key in the plurality of virtual keys requires a first touch duration to be activated, a second virtual key in the plurality of virtual keys requires a second touch duration to be activated, and the first touch duration is less than the second touch duration, and wherein the first virtual key is adjacent to the second virtual key.

6. A method, comprising:

at a computing device with a multipoint sensing touch screen display, a processor, and a memory:

detecting a touch by a user on the multipoint sensing touch screen display;

determining a behavior of the user's touch by processing signals created by the multipoint sensing touch screen display in response to the user's touch, wherein the behavior includes spatial domain behavior and time domain behavior;

accessing a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

matching the determined behavior of the user's touch to a predetermined behavioral characteristic for a virtual key;

determining a reaction for the virtual key in the data structure that corresponds to the matched predetermined behavioral characteristic for the virtual key; and performing an action that corresponds to the determined reaction, wherein a first virtual key in the plurality of virtual keys requires a first touch duration to be activated, a second virtual key in the plurality of virtual keys requires a second touch duration to be activated, and the first touch duration is less than the second touch duration, and wherein the second virtual key is a delete key.

7. A method, comprising:

at a computing device with a multipoint sensing touch screen display, a processor, and a memory:

detecting a touch by a user on the multipoint sensing touch screen display;

determining a behavior of the user's touch by processing signals created by the multipoint sensing touch screen display in response to the user's touch, wherein the behavior includes spatial domain behavior and time domain behavior;

accessing a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

matching the determined behavior of the user's touch to a predetermined behavioral characteristic for a virtual key;

determining a reaction for the virtual key in the data structure that corresponds to the matched predetermined behavioral characteristic for the virtual key; and performing an action that corresponds to the determined reaction, wherein a first virtual key in the plurality of virtual keys requires a first touch duration to be activated, a second virtual key in the plurality of virtual keys requires a second touch duration to be activated, and the first touch duration is less than the second touch duration, and wherein activation of the second virtual key requires detection of an additional confirmation gesture.

8. The method of claim 7, wherein the additional confirmation gesture is a wiggle gesture.

9. A computing device, comprising:
a multipoint sensing touch screen display;
a processor;
a memory; and
one or more programs, wherein the one or more programs are stored in the memory and configured to be executed by the processor, the one or more programs including instructions for:
  detecting a touch by a user on the multipoint sensing touch screen display;
  determining a behavior of the user's touch by processing signals created by the multipoint sensing touch screen display in response to the user's touch, wherein the behavior includes spatial domain behavior and time domain behavior;
  accessing a data structure in the memory, the data structure comprising data representing:
    a plurality of virtual keys; and
    for each virtual key in the plurality of virtual keys:
      a plurality of predetermined behavioral characteristics, wherein each predetermined behavioral characteristic in the plurality of predetermined behavioral characteristics includes predetermined values of behavior in the spatial domain and/or time domain; and
      a respective reaction for each respective predetermined behavioral characteristic in the plurality of predetermined behavioral characteristics;
  matching the determined behavior of the user's touch to a predetermined behavioral characteristic for a virtual key;
  determining a reaction for the virtual key in the data structure that corresponds to the matched predetermined behavioral characteristic for the virtual key; and
  performing an action that corresponds to the determined reaction,
wherein a first virtual key in the plurality of virtual keys requires a first pressure to be activated, a second virtual key in the plurality of virtual keys requires a second pressure to be activated, and the first pressure is less than the second pressure, and
wherein the first virtual key is adjacent to the second virtual key.

10. A computing device, comprising:
a multipoint sensing touch screen display;
a processor;
a memory; and
one or more programs, wherein the one or more programs are stored in the memory and configured to be executed by the processor, the one or more programs including instructions for:
  detecting a touch by a user on the multipoint sensing touch screen display;
  determining a behavior of the user's touch by processing signals created by the multipoint sensing touch screen display in response to the user's touch, wherein the behavior includes spatial domain behavior and time domain behavior;
  accessing a data structure in the memory, the data structure comprising data representing:
    a plurality of virtual keys; and
    for each virtual key in the plurality of virtual keys:
      a plurality of predetermined behavioral characteristics, wherein each predetermined behavioral characteristic in the plurality of predetermined behavioral characteristics includes predetermined values of behavior in the spatial domain and/or time domain; and
      a respective reaction for each respective predetermined behavioral characteristic in the plurality of predetermined behavioral characteristics;
  matching the determined behavior of the user's touch to a predetermined behavioral characteristic for a virtual key;
  determining a reaction for the virtual key in the data structure that corresponds to the matched predetermined behavioral characteristic for the virtual key; and performing an action that corresponds to the determined reaction,
wherein a first virtual key in the plurality of virtual keys requires a first pressure to be activated, a second virtual key in the plurality of virtual keys requires a second pressure to be activated, and the first pressure is less than the second pressure, and
wherein the second virtual key is a delete key.

11. A computing device, comprising:
a multipoint sensing touch screen display;
a processor;
a memory; and
one or more programs, wherein the one or more programs are stored in the memory and configured to be executed by the processor, the one or more programs including instructions for:
  detecting a touch by a user on the multipoint sensing touch screen display;
  determining a behavior of the user's touch by processing signals created by the multipoint sensing touch screen display in response to the user's touch, wherein the behavior includes spatial domain behavior and time domain behavior;
  accessing a data structure in the memory, the data structure comprising data representing:
    a plurality of virtual keys; and
    for each virtual key in the plurality of virtual keys:
      a plurality of predetermined behavioral characteristics, wherein each predetermined behavioral characteristic in the plurality of predetermined behavioral characteristics includes predetermined values of behavior in the spatial domain and/or time domain; and
      a respective reaction for each respective predetermined behavioral characteristic in the plurality of predetermined behavioral characteristics;
  matching the determined behavior of the user's touch to a predetermined behavioral characteristic for a virtual key;
  determining a reaction for the virtual key in the data structure that corresponds to the matched predetermined behavioral characteristic for the virtual key; and
  performing an action that corresponds to the determined reaction,
wherein a first virtual key in the plurality of virtual keys requires a first pressure to be activated, a second virtual key in the plurality of virtual keys requires a second pressure to be activated, and the first pressure is less than the second pressure, and
wherein activation of the second virtual key requires detection of an additional confirmation gesture.

12. The computing device of claim 11, wherein the additional confirmation gesture is a wiggle gesture.

13. A computing device, comprising:
a multipoint sensing touch screen display;
a processor;
a memory; and
one or more programs, wherein the one or more programs are stored in the memory and configured to be executed by the processor, the one or more programs including instructions for:
detecting a touch by a user on the multipoint sensing touch screen display;
determining a behavior of the user's touch by processing signals created by the multipoint sensing touch screen display in response to the user's touch, wherein the behavior includes spatial domain behavior and time domain behavior;
accessing a data structure in the memory, the data structure comprising data representing:
a plurality of virtual keys; and
for each virtual key in the plurality of virtual keys:
a plurality of predetermined behavioral characteristics, wherein each predetermined behavioral characteristic in the plurality of predetermined behavioral characteristics includes predetermined values of behavior in the spatial domain and/or time domain; and
a respective reaction for each respective predetermined behavioral characteristic in the plurality of predetermined behavioral characteristics;
matching the determined behavior of the user's touch to a predetermined behavioral characteristic for a virtual key;
determining a reaction for the virtual key in the data structure that corresponds to the matched predetermined behavioral characteristic for the virtual key; and
performing an action that corresponds to the determined reaction,
wherein a first virtual key in the plurality of virtual keys requires a first touch duration to be activated, a second virtual key in the plurality of virtual keys requires a second touch duration to be activated, and the first touch duration is less than the second touch duration, and
wherein the first virtual key is adjacent to the second virtual key.

14. A computing device, comprising:
a multipoint sensing touch screen display;
a processor;
a memory; and
one or more programs, wherein the one or more programs are stored in the memory and configured to be executed by the processor, the one or more programs including instructions for:
detecting a touch by a user on the multipoint sensing touch screen display;
determining a behavior of the user's touch by processing signals created by the multipoint sensing touch screen display in response to the user's touch, wherein the behavior includes spatial domain behavior and time domain behavior;
accessing a data structure in the memory, the data structure comprising data representing:
a plurality of virtual keys; and
for each virtual key in the plurality of virtual keys:
a plurality of predetermined behavioral characteristics, wherein each predetermined behavioral characteristic in the plurality of predetermined behavioral characteristics includes predetermined values of behavior in the spatial domain and/or time domain; and
a respective reaction for each respective predetermined behavioral characteristic in the plurality of predetermined behavioral characteristics;
matching the determined behavior of the user's touch to a predetermined behavioral characteristic for a virtual key;
determining a reaction for the virtual key in the data structure that corresponds to the matched predetermined behavioral characteristic for the virtual key; and
performing an action that corresponds to the determined reaction,
wherein a first virtual key in the plurality of virtual keys requires a first touch duration to be activated, a second virtual key in the plurality of virtual keys requires a second touch duration to be activated, and the first touch duration is less than the second touch duration, and
wherein the second virtual key is a delete key.

15. A computing device, comprising:
a multipoint sensing touch screen display;
a processor;
a memory; and
one or more programs, wherein the one or more programs are stored in the memory and configured to be executed by the processor, the one or more programs including instructions for:
detecting a touch by a user on the multipoint sensing touch screen display;
determining a behavior of the user's touch by processing signals created by the multipoint sensing touch screen display in response to the user's touch, wherein the behavior includes spatial domain behavior and time domain behavior;
accessing a data structure in the memory, the data structure comprising data representing:
a plurality of virtual keys; and
for each virtual key in the plurality of virtual keys:
a plurality of predetermined behavioral characteristics, wherein each predetermined behavioral characteristic in the plurality of predetermined behavioral characteristics includes predetermined values of behavior in the spatial domain and/or time domain; and
a respective reaction for each respective predetermined behavioral characteristic in the plurality of predetermined behavioral characteristics;
matching the determined behavior of the user's touch to a predetermined behavioral characteristic for a virtual key;
determining a reaction for the virtual key in the data structure that corresponds to the matched predetermined behavioral characteristic for the virtual key; and
performing an action that corresponds to the determined reaction, wherein a first virtual key in the plurality of virtual keys requires a first touch duration to be activated, a second virtual key in the plurality of virtual keys requires a second touch duration to be activated, and the first touch duration is less than the second touch duration, and wherein activation of the second virtual key requires detection of an additional confirmation gesture.

16. The computing device of claim 15, wherein the additional confirmation gesture is a wiggle gesture.

17. A computer readable storage medium storing one or more programs, the one or more programs comprising instructions, which when executed by a computing device with a multipoint sensing touch screen display, cause the device to:

detect a touch by a user on the multipoint sensing touch screen display;

determine a behavior of the user's touch by processing signals created by the multipoint sensing touch screen display in response to the user's touch, wherein the behavior includes spatial domain behavior and time domain behavior;

access a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

match the determined behavior of the user's touch to a predetermined behavioral characteristic for a virtual key;

determine a reaction for the virtual key in the data structure that corresponds to the matched predetermined behavioral characteristic for the virtual key; and perform an action that corresponds to the determined reaction, wherein a first virtual key in the plurality of virtual keys requires a first pressure to be activated, a second virtual key in the plurality of virtual keys requires a second pressure to be activated, and the first pressure is less than the second pressure, and wherein the first virtual key is adjacent to the second virtual key.

18. A computer readable storage medium storing one or more programs, the one or more programs comprising instructions, which when executed by a computing device with a multipoint sensing touch screen display, cause the device to:

detect a touch by a user on the multipoint sensing touch screen display;

determine a behavior of the user's touch by processing signals created by the multipoint sensing touch screen display in response to the user's touch, wherein the behavior includes spatial domain behavior and time domain behavior;

access a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

match the determined behavior of the user's touch to a predetermined behavioral characteristic for a virtual key;

determine a reaction for the virtual key in the data structure that corresponds to the matched predetermined behavioral characteristic for the virtual key; and perform an action that corresponds to the determined reaction, wherein a first virtual key in the plurality of virtual keys requires a first pressure to be activated, a second virtual key in the plurality of virtual keys requires a second pressure to be activated, and the first pressure is less than the second pressure, and wherein the second virtual key is a delete key.

19. A computer readable storage medium storing one or more programs, the one or more programs comprising instructions, which when executed by a computing device with a multipoint sensing touch screen display, cause the device to:

detect a touch by a user on the multipoint sensing touch screen display;

determine a behavior of the user's touch by processing signals created by the multipoint sensing touch screen display in response to the user's touch, wherein the behavior includes spatial domain behavior and time domain behavior;

access a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

match the determined behavior of the user's touch to a predetermined behavioral characteristic for a virtual key;

determine a reaction for the virtual key in the data structure that corresponds to the matched predetermined behavioral characteristic for the virtual key; and perform an action that corresponds to the determined reaction, wherein a first virtual key in the plurality of virtual keys requires a first pressure to be activated, a second virtual key in the plurality of virtual keys requires a second pressure to be activated, and the first pressure is less than the second pressure, and wherein activation of the second virtual key requires detection of an additional confirmation gesture.

20. The computer readable storage medium of claim 19, wherein the additional confirmation gesture is a wiggle gesture.

21. A computer readable storage medium storing one or more programs, the one or more programs comprising instructions, which when executed by a computing device with a multipoint sensing touch screen display, cause the device to:

detect a touch by a user on the multipoint sensing touch screen display;

determine a behavior of the user's touch by processing signals created by the multipoint sensing touch screen display in response to the user's touch, wherein the behavior includes spatial domain behavior and time domain behavior;

access a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

match the determined behavior of the user's touch to a predetermined behavioral characteristic for a virtual key;

determine a reaction for the virtual key in the data structure that corresponds to the matched predetermined behavioral characteristic for the virtual key; and perform an action that corresponds to the determined reaction, wherein a first virtual key in the plurality of virtual keys requires a first touch duration to be activated, a second virtual key in the plurality of virtual keys requires a second touch duration to be activated, and the first touch duration is less than the second touch duration, and wherein the first virtual key is adjacent to the second virtual key.

22. A computer readable storage medium storing one or more programs, the one or more programs comprising instructions, which when executed by a computing device with a multipoint sensing touch screen display, cause the device to:

detect a touch by a user on the multipoint sensing touch screen display;

determine a behavior of the user's touch by processing signals created by the multipoint sensing touch screen display in response to the user's touch, wherein the behavior includes spatial domain behavior and time domain behavior;

access a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

match the determined behavior of the user's touch to a predetermined behavioral characteristic for a virtual key;

determine a reaction for the virtual key in the data structure that corresponds to the matched predetermined behavioral characteristic for the virtual key; and perform an action that corresponds to the determined reaction, wherein a first virtual key in the plurality of virtual keys requires a first touch duration to be activated, a second virtual key in the plurality of virtual keys requires a second touch duration to be activated, and the first touch duration is less than the second touch duration, and wherein the second virtual key is a delete key.

23. A computer readable storage medium storing one or more programs, the one or more programs comprising instructions, which when executed by a computing device with a multipoint sensing touch screen display, cause the device to:

detect a touch by a user on the multipoint sensing touch screen display;

determine a behavior of the user's touch by processing signals created by the multipoint sensing touch screen display in response to the user's touch, wherein the behavior includes spatial domain behavior and time domain behavior;

access a data structure in the memory, the data structure comprising data representing:

a plurality of virtual keys; and for each virtual key in the plurality of virtual keys:

a plurality of predetermined behavioral characteristics, wherein each predetermined behavioral characteristic in the plurality of predetermined behavioral characteristics includes predetermined values of behavior in the spatial domain and/or time domain; and a respective reaction for each respective predetermined behavioral characteristic in the plurality of predetermined behavioral characteristics;

match the determined behavior of the user's touch to a predetermined behavioral characteristic for a virtual key;

determine a reaction for the virtual key in the data structure that corresponds to the matched predetermined behavioral characteristic for the virtual key; and perform an action that corresponds to the determined reaction, wherein a first virtual key in the plurality of virtual keys requires a first touch duration to be activated, a second virtual key in the plurality of virtual keys requires a second touch duration to be activated, and the first touch duration is less than the second touch duration, and wherein activation of the second virtual key requires detection of an additional confirmation gesture.

24. The computer readable storage medium of claim 23, wherein the additional confirmation gesture is a wiggle gesture.

\* \* \* \* \*

UNITED STATES PATENT AND TRADEMARK OFFICE
CERTIFICATE OF CORRECTION

PATENT NO. : 7,614,008 B2  Page 1 of 1
APPLICATION NO. : 11/228700
DATED : November 3, 2009
INVENTOR(S) : Bas Ording It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Fourteenth Day of December, 2010

David J. Kappos
*Director of the United States Patent and Trademark Office*